United States Patent
Haijima et al.

(10) Patent No.: US 9,523,010 B2
(45) Date of Patent: Dec. 20, 2016

(54) INK COMPOSITION FOR INKJET PRINTING, INK SET, AND IMAGE FORMING METHOD

(71) Applicant: FUJIFILM CORPORATION, Minato-ku, Tokyo (JP)

(72) Inventors: Akimitsu Haijima, Kanagawa (JP); Katsuyuki Yofu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 436 days.

(21) Appl. No.: 14/198,594

(22) Filed: Mar. 6, 2014

(65) Prior Publication Data

US 2014/0292966 A1    Oct. 2, 2014

(30) Foreign Application Priority Data

Mar. 29, 2013 (JP) ................. 2013-074586

(51) Int. Cl.
*C09D 11/30* (2014.01)
*C09D 11/101* (2014.01)
(Continued)

(52) U.S. Cl.
CPC ............. *C09D 11/30* (2013.01); *C09D 11/101* (2013.01); *C09D 11/40* (2013.01); *C09D 11/54* (2013.01)

(58) Field of Classification Search
CPC .......... C09D 11/30; C09D 11/38; C09D 11/54
See application file for complete search history.

(56) References Cited

U.S. PATENT DOCUMENTS

| | | | |
|---|---|---|---|
| 8,905,534 B2* | 12/2014 | Amao | C09D 11/00 347/100 |
| 9,011,588 B2* | 4/2015 | Fujii | B41M 5/0011 106/31.43 |
| 2011/0050790 A1* | 3/2011 | Irita | C09D 7/125 347/21 |

FOREIGN PATENT DOCUMENTS

| JP | 2000-186242 A | 7/2000 |
|---|---|---|
| JP | 2004-189930 | 7/2004 |

(Continued)

OTHER PUBLICATIONS

Machine translation of JP 2004-189930 acquired on Jul. 8, 2016.*

(Continued)

*Primary Examiner* — Gerard Higgins
(74) *Attorney, Agent, or Firm* — SOLARIS Intellectual Property Group, PLLC

(57) ABSTRACT

The invention provides an ink composition for inkjet printing, the ink composition containing water, a coloring material, a polymerizable compound, a polymerization initiator represented by the following Formula (X), and polymer particles having a glass transition temperature of 90° C. or higher, a mass ratio of the polymer particles to the polymerization initiator represented by Formula (X) being in a range of from 1:10 to 10:1 [in Formula (X), each of $R^{X1}$, $R^{X2}$, $R^{X3}$, and $R^{X4}$ independently represents a hydrogen atom or a substituent; and n represents an integer from 1 to 4].

(Continued)

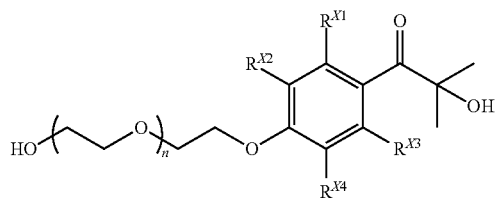

Formula (X)

12 Claims, 1 Drawing Sheet

(51) Int. Cl.
*C09D 11/40* (2014.01)
*C09D 11/54* (2014.01)

(56) References Cited

FOREIGN PATENT DOCUMENTS

| JP | 2011-046872 A | 3/2011 |
| JP | 2012-067159 | 4/2012 |
| JP | 2012-137964 A | 7/2012 |
| JP | 2013-18846 A | 1/2013 |
| WO | WO2013008626 A1 * | 1/2013 |

OTHER PUBLICATIONS

English language translation of the following: Office action dated Feb. 10, 2015, from the JPO in a Japanese patent application corresponding to the instant patent application.

Extended European Search Report dated Aug. 13, 2014 from the EPO in an European patent application corresponding to the instant patent application.

* cited by examiner

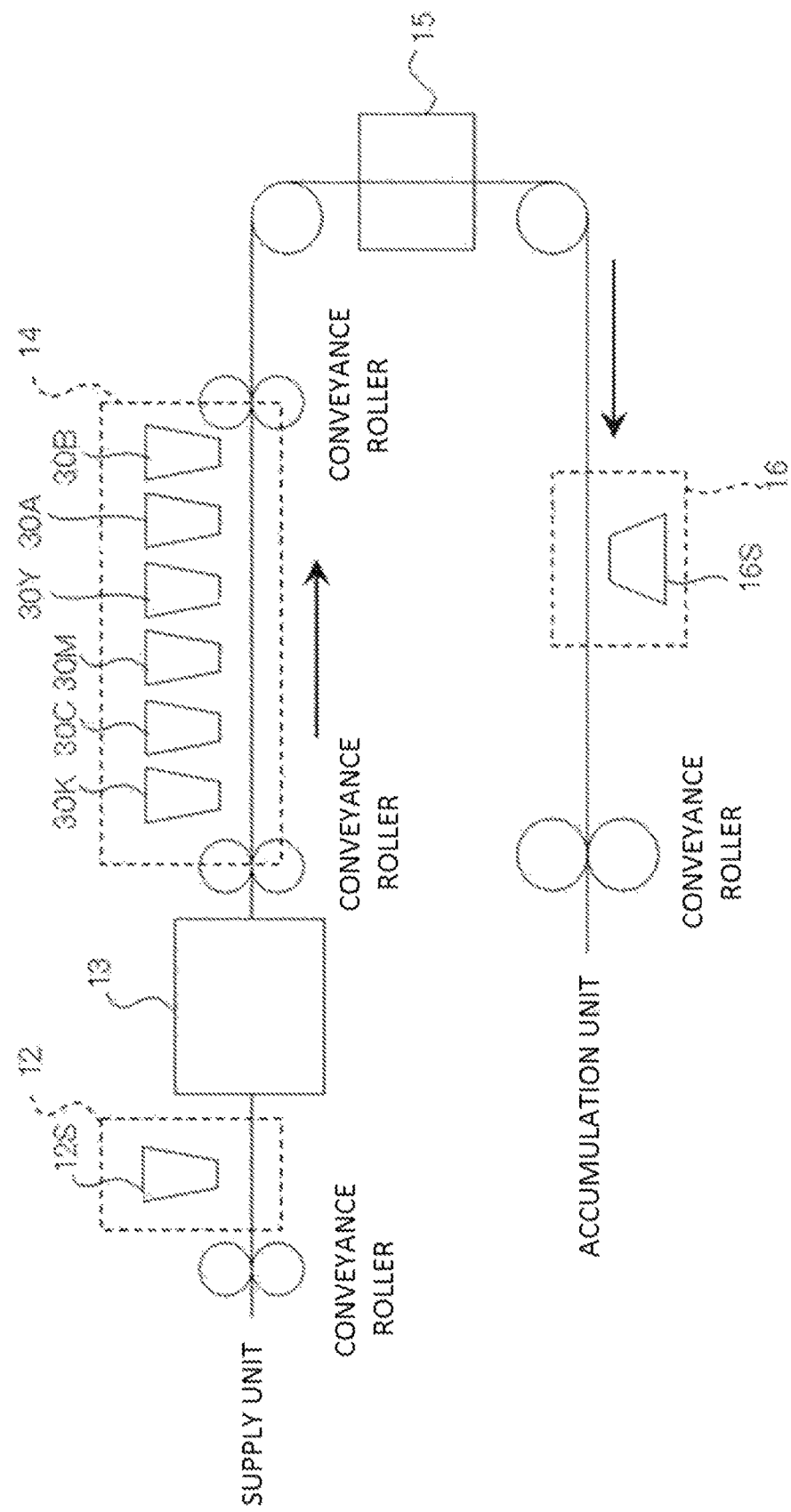

INK COMPOSITION FOR INKJET PRINTING, INK SET, AND IMAGE FORMING METHOD

CROSS-REFERENCE TO RELATED APPLICATIONS

This application is based on and claims priority under 35 USC 119 from Japanese Patent Application No. 2013-074586 filed on Mar. 29, 2013, the disclosure of which is incorporated by reference herein.

BACKGROUND

Technical Field

The present invention relates to an ink composition for inkjet printing, an ink set, and an image formation method.

Related Art

As an ink composition for inkjet printing (hereinafter, also simply referred to as the "ink") used in an image forming method by an inkjet method, a water-based ink using water as a solvent draws attention besides a solvent-based ink using a solvent as a solvent in consideration of the global environment and the work environment.

In addition, a technology is under investigation in which a polymerizable compound and a polymerization initiator are contained in an ink, and this ink is cured whereby to form an image having high scratch resistance to scratch and the like (hereinafter, also referred to as the "scratch resistance").

For example, known is an ink used for inkjet recording containing a coloring material, a polymerizable oligomer, a photopolymerization initiator and water, in which the photopolymerization initiator has 3% by weight or more of the solubility with respect to water, as an ink that has less influence of the photo-curable oligomer and the photopolymerization initiator, which are essential components of a photo-curable ink, on the image (for example, see Japanese Patent Application Laid-Open (JP-A) No. 2000-186242).

In addition, known is an ink for inkjet that is excellent in preservation stability and discharge stability of the ink, has diversity for a recording medium, and allows an image excellent in bleed resistance, scratch resistance, water resistance and shiny appearance, which contains a coloring material, water, a high molecular compound which has plural side chains in a hydrophilic main chain and can be crosslinked between the side chains by irradiation of an active energy ray, and a water-soluble photopolymerization initiator (for example, see JP-A No. 2012-137964).

In addition, known is an ink set that can form an image by being immobilized onto a recording medium, and is excellent in the scratch resistance, and excellent in evenness of the surface of an image and blocking resistance, which contains an ink composition including a pigment, polymer particles having a glass transition temperature of 70° C. or higher and a volume average particle diameter of 70 nm or less, and a water-soluble polymerizable compound being polymerized by an active energy ray, and a process liquid containing a flocculant that flocculates the components in the ink composition (for example, see JP-A No. 2011-46872).

In addition, known is an ink composition that is excellent in preservation stability and curability after image formation, which contains a specific structure of a polyvalent (meth)acrylamide compound and a polymerization initiator (for example, see JP-A No. 2013-18846).

SUMMARY

According to an aspect of the present invention, there is provided an ink composition for inkjet printing, the ink composition containing water, a coloring material, a polymerizable compound, a polymerization initiator represented by the following Formula (X), and polymer particles having a glass transition temperature of 90° C. or higher, a mass ratio of the polymer particles to the polymerization initiator represented by Formula (X) being in a range of from 1:10 to 10:1:

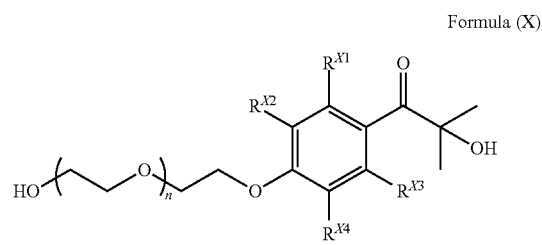

Formula (X)

wherein, in Formula (X), each of $R^{X1}$, $R^{X2}$, $R^{X3}$, and $R^{X4}$ independently represents a hydrogen atom or a substituent; and n represents an integer from 1 to 4.

BRIEF DESCRIPTION OF THE DRAWINGS

Exemplary embodiments of the present invention will be described in detail, based on the following figures, wherein:

FIG. 1 is a schematic block diagram that illustrates a configuration example of an inkjet recording device that is used in implementing image formation.

DETAILED DESCRIPTION

In an ink containing a polymerizable compound and a polymerization initiator, 1-[4-(2-hydroxyethoxy)-phenyl]-2-hydroxy-2-methyl-1-propane-1-one may be used as a polymerization initiator. Examples of a commercial product of the polymerization initiator include IRGACURE 2959 (trade name) (manufactured by BASF Japan Ltd.).

On the other hand, polymer particles may be contained in an ink from the viewpoint of improving the scratch resistance and suppressing the image irregularity of an image.

However, in the ink containing the polymerization initiator and polymer particles described above and further containing water as a solvent (water-based ink), a precipitate (including a precipitate of the polymerization initiator itself described above) may be generated due to the polymerization initiator described above under a low temperature environment.

Herein, examples of the "under the low temperature environment" include at the time of preservation under a low temperature environment, at the time of transportation under a low temperature environment, at the time of use under a low temperature environment, and the like.

In addition, with the water-based ink containing polymer particles, discharge property of an ink from an inkjet nozzle (hereinafter, also simply referred to as a "nozzle") may be deteriorated.

The invention has been made in view of the above described circumstances, and according to the invention, it is possible to provide an ink composition, an ink set, and an image forming method which allow suppression of generation of a precipitate under a low temperature environment, excellent discharge property from an inkjet nozzle, and formation of an image that has excellent scratch resistance and suppressed irregularity (image irregularity).

Hereinafter, the ink composition for inkjet, and the ink set using the same, and the image forming method of the invention are described in detail.

A numerical range indicated using "A to B" in the specification represents a range with the numerical values of A and B as a minimum value and a maximum value, respectively.

<<Ink Composition for Inkjet>>

The ink composition for inkjet of the invention (hereinafter, also simply referred to as an "ink composition" or "ink") contains water, a coloring material, a polymerizable compound, a polymerization initiator represented by Formula (X) described below (hereinafter, also referred to as a "specific polymerization initiator"), and polymer particles having a glass transition temperature of 90° C. or higher, a mass ratio of the polymer particles to the polymerization initiator represented by Formula (X) being in a range of from 0.1 to 10.0 (hereinafter, also referred to as "specific polymer particles").

The ink composition of the invention may contain other components as necessary.

Hereinafter, a content ratio by mass, that is, a mass ratio of the specific polymer particles with respect to the specific polymerization initiator [the content of the specific polymer particles/the content of the specific polymerization initiator] may be referred to as a "mass ratio [specific polymer particles/specific polymerization initiator]".

In addition, when the mass ratio of the specific polymer particles is X folds by mass with respect to the specific polymerization initiator, it may be referred to as "the mass ratio [specific polymer particles/specific polymerization initiator] is X".

Generally, 1-[4-(2-hydroxyethoxy)-phenyl]-2-hydroxy-2-methyl-1-propane-1-one may be used as a polymerization initiator that is excellent in the sensitivity with respect to an active energy ray (for example, ultraviolet ray) (hereinafter, also simply referred to as a "sensitivity") in an ink containing a polymerizable compound and a polymerization initiator. Examples of a commercial product of this polymerization initiator include IRGACURE 2959 (trade name) (manufactured by BASF Japan Ltd.).

However, according to investigation of the inventors, it was turned out that with a water-based ink containing the polymerization initiator and the polymer particles described above, and further containing water as a solvent, a precipitate (a precipitate including the polymerization initiator itself) may be generated under low temperature (for example, +5° C. or lower) environment due to the polymerization initiator described above. Furthermore, it was turned out that this generation of the precipitate tends to become remarkable in accordance with an increase in the content of the polymer particles. The reason for generation of the precipitate is considered to be low solubility of 1-[4-(2-hydroxyethoxy)-phenyl]-2-hydroxy-2-methyl-1-propane-1-one with respect to water.

With regard to this point, the ink composition of the invention allows suppression of the generation of a precipitate under a low temperature environment while maintaining the sensitivity to some extent by using the polymerization initiator represented by Formula (X) described below (a specific polymerization initiator), and setting the mass ratio [specific polymer particles/specific polymerization initiator] to 10.0 or less.

In addition, in a case of a water-based ink containing polymer particles, the discharge property of the ink from an inkjet nozzle (hereinafter, also simply referred to as the "nozzle") (particularly, the discharge property when the ink is consecutively discharged from the nozzle; hereinafter, also referred to as a "consecutive discharge property") may be deteriorated. Such a deterioration of discharge property may be further promoted depending on the kind of the polymerization initiator contained in the ink.

With regard to this point, in the ink composition of the invention, deterioration of discharge property can be suppressed by using a specific polymerization initiator as the polymerization initiator, and setting the mass ratio [specific polymer particles/specific polymerization initiator] to 10.0 or less.

In addition, in the ink composition of the invention, an image that has excellent scratch resistance and has suppressed image irregularity can be formed by using the polymer particles having a glass transition temperature of 90° C. or higher (a specific polymer particle), and setting the mass ratio [specific polymer particles/specific polymerization initiator] to 0.1 or more.

As described above, according to the ink composition of the invention, it is possible to suppress generation of a precipitate under a low temperature environment, and suppress deterioration of discharge property from the inkjet nozzle, and form an image that has excellent scratch resistance and has suppressed irregularity (the image irregularity).

The ink composition of the invention enables to suppress generation of a precipitate, and obtain excellent discharge property, and form an image that has excellent scratch resistance and has suppressed irregularity (the image irregularity) particularly even when the ink composition is used after being preserved under a low temperature environment.

In a case in which the ink composition does not contain a specific polymerization initiator (the polymerization initiator represented by Formula (X)), generation of a precipitate may become remarkable under a low temperature environment. Furthermore, the discharge property may be deteriorated as well.

In addition, in a case in which the mass ratio [specific polymer particles/specific polymerization initiator] is less than 0.1, the scratch resistance of an image may be deteriorated, and the image irregularity may become remarkable.

On the other hand, in a case in which the mass ratio [specific polymer particles/specific polymerization initiator] exceeds 10.0, the discharge property may be deteriorated. In addition, a precipitate may be generated under a low temperature environment.

For these reasons, the mass ratio [specific polymer particles/specific polymerization initiator] is 0.1 to 10.0, preferably 0.1 to 5.0, more preferably 0.3 to 5.0, and particularly preferably 0.3 to 3.0 in the ink composition of the invention.

In addition, the ink composition of the invention can form an image that has excellent scratch resistance and has suppressed image irregularity by containing the specific polymer particles.

In a case in which the ink composition does not contain the specific polymer particles, the scratch resistance of an image is deteriorated, and the image irregularity becomes remarkable. Particularly, in a case in which the glass transition temperature of the polymer particles contained is less than 90° C., the scratch resistance of an image is deteriorated, and the image irregularity becomes remarkable even if the ink composition contains the polymer particles.

The glass transition temperature is preferably 100° C. or higher from the viewpoint of further improving the scratch resistance of an image, and further suppressing the image irregularity.

In addition, the glass transition temperature of the polymer particles is preferably 250° C. or lower, and more preferably 230° C. or lower. When the glass transition temperature of the polymer particles is 250° C. or lower, the polymer particles are fused in a drying process, which further improves the image intensity and the scratch resistance.

Preferred embodiments of the specific polymer particles are described below.

Hereinafter, each of the components of the ink composition of the invention is described.

<Polymerization Initiator>

The ink composition of the invention contains at least one kind of a polymerization initiator represented by Formula (X) below (a specific polymerization initiator; hereinafter, also referred to as a "compound represented by Formula (X)").

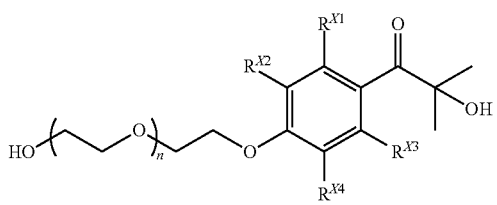

Formula (X)

In Formula (X), each of $R^{X1}$, $R^{X2}$, $R^{X3}$, and $R^{X4}$ independently represents a hydrogen atom or a substituent. In Formula (X), n represents an integer from 1 to 4.

By setting n to 1 or more, generation of a precipitate under a low temperature environment is suppressed.

By setting n to 4 or less, high sensitivity is maintained, and as a result thereof, an image formed with the ink composition is improved in the scratch resistance, and has suppressed image irregularity.

n is more preferably from 1 to 3, and particularly preferably from 1 to 2.

In addition, by using a specific polymerization initiator of the structure represented by Formula (X) as the polymerization initiator in the ink composition, the phenomenon where the specific polymer particles in the ink composition flocculate, and the phenomenon where the discharge property deteriorates due to the flocculation are suppressed.

Examples of the substituent in $R^{X1}$ to $R^{X4}$ include a halogen atom, an alkyl group, an alkoxy group, a hydroxy group, an alkylthio group, a mercapto group, an acyl group and an amino group.

The halogen atom in $R^{X1}$ to $R^{X4}$ is preferably a fluorine atom, a chlorine atom, a bromine atom or an iodine atom, more preferably a chlorine atom or a bromine atom and particularly preferably a chlorine atom.

The carbon atom number of the alkyl group in $R^{X1}$ to $R^{X4}$ is preferably 1 to 6 of the carbon atom number, and more preferably 1 to 3 of the carbon atom number.

In addition, the alkyl group in $R^{X1}$ to $R^{X4}$ may be a linear alkyl group, or may be a branched alkyl group. In addition, the alkyl group may have an alicyclic structure.

Examples of the alkyl group in $R^{X1}$ to $R^{X4}$ include a methyl group, an ethyl group, an n-propyl group, an isopropyl group, an n-butyl group, a s-butyl group, a t-butyl group, an n-pentyl group, an n-hexyl group and a cyclohexyl group, and preferably a methyl group, an ethyl group, an n-propyl group and an isopropyl group.

The carbon atom number of the alkoxy group in $R^{X1}$ to $R^{X4}$ is preferably 1 to 6 of the carbon atom number, and more preferably 1 to 3 of the carbon atom number.

In addition, the alkoxy group in $R^{X1}$ to $R^{X4}$ may be a linear alkoxy group, or may be a branched alkoxy group. In addition, the alkoxy group may have an alicyclic structure.

Examples of the alkoxy group in $R^{X1}$ to $R^{X4}$ include a methoxy group, an ethoxy group, an n-propyloxy group, an isopropyloxy group, an n-butoxy group, a s-butoxy group, a t-butoxy group, an n-pentyloxy group, an n-hexyloxy group and a cyclohexyloxy group, and preferably a methoxy group, an ethoxy group, an n-propyloxy group and an isopropyloxy group.

The carbon atom number of the alkylthio group in $R^{X1}$ to $R^{X4}$ is preferably 1 to 6 of the carbon atom number, and more preferably 1 to 4 of the carbon atom number.

In addition, the alkylthio group in $R^{X1}$ to $R^{X4}$ may be a linear alkylthio group, or may be a branched alkylthio group. In addition, the alkylthio group may have an alicyclic structure.

Examples of the alkylthio group in $R^{X1}$ to $R^{X4}$ include a methylthio group, an ethylthio group, an n-propylthio group, an isopropylthio group, an n-butylthio group, a s-butylthio group, a t-butylthio group, an n-pentylthio group, an n-hexylthio group and a cyclohexylthio group, and preferably a methylthio group, an ethylthio group, an n-propylthio group and an isopropylthio group.

The carbon atom number of the acyl group in $R^{X1}$ to $R^{X4}$ is preferably 1 to 6 of the carbon atom number, and more preferably 1 to 3 of the carbon atom number.

In addition, the acyl group in $R^{X1}$ to $R^{X4}$ may be a linear acyl group, or may be a branched acyl group.

Examples of the acyl group in $R^{X1}$ to $R^{X4}$ include a formyl group, an acetyl group, an ethylacyl group, an n-propylacyl group and an isopropylacyl group, and preferably a formyl group, an acetyl group and an ethylacyl group.

$R^{X1}$ to $R^{X4}$ are preferably a hydrogen atom, a halogen atom, an alkyl group, an alkoxy group or an alkylthio group, more preferably a hydrogen atom, an alkoxy group or an alkylthio group, and most preferably a hydrogen atom.

In addition, examples of a preferred embodiment of the compound represented by Formula (X) include embodiments in which two or more (preferably three or more, most preferably four) of $R^{X1}$ to $R^{X4}$ are a hydrogen atom.

Hereinafter, specific examples (exemplary compound) of the compound represented by Formula (X) are shown, but the compound represented by Formula (X) is not limited thereto.

| Exemplary compound No. | Formula (X) | | | | |
|---|---|---|---|---|---|
| | n | $R^{X1}$ | $R^{X2}$ | $R^{X3}$ | $R^{X4}$ |
| (X)-1 | 1 | H | H | H | H |
| (X)-2 | 3 | H | H | H | H |
| (X)-3 | 1 | H | $CH_3$ | H | H |
| (X)-4 | 1 | $CH_3$ | H | H | H |
| (X)-5 | 1 | H | $OCH_3$ | H | H |
| (X)-6 | 1 | H | Br | H | H |
| (X)-7 | 1 | H | Cl | H | Cl |
| (X)-8 | 1 | Cl | Cl | H | H |
| (X)-9 | 1 | H | OH | H | H |
| (X)-10 | 1 | H | H | $SCH_3$ | H |
| (X)-11 | 2 | H | H | H | H |
| (X)-12 | 2 | H | $COCH_3$ | H | H |
| (X)-13 | 3 | H | H | $CH_3$ | H |
| (X)-14 | 3 | H | H | $N(CH_3)_2$ | H |
| (X)-15 | 3 | H | SH | H | H |

The compound represented by Formula (X) (a specific polymerization initiator) can be synthesized, for example, in accordance with the method described in paragraphs [0067] to [0071] and [0112] to [0115] of JP-A No. 2000-186242.

The content of the compound represented by Formula (X) (a specific polymerization initiator) in the ink composition of the invention is not particularly limited, but is preferably 0.3% by mass to 10.0% by mass, more preferably 0.5% by mass to 7.0% by mass, and particularly preferably 0.8% by mass to 5.0% by mass with respect to the total amount of the ink composition.

When the content is 0.3% by mass or more, the sensitivity is further improved, the scratch resistance of an image is further improved, and the image irregularity is further reduced.

When the content is 10.0% by mass or less, generation of a precipitate under a low temperature environment can be further suppressed. Furthermore, the total amount of non-volatile components can be reduced, and from this, the scratch resistance of an image is further improved, and the image irregularity is further reduced.

The ink composition of the invention preferably further contains 1-[4-(2-hydroxyethoxy)-phenyl]-2-hydroxy-2-methyl-1-propane-1-one in addition to a specific polymerization initiator. This compound is a polymerization initiator that is excellent in the sensitivity as described above. According to this preferred embodiment, the scratch resistance of an image can be further improved, and the image irregularity can be further suppressed.

In this case, the content ratio of 1-[4-(2-hydroxyethoxy)-phenyl]-2-hydroxy-2-methyl-1-propane-1-one with respect to the specific polymerization initiator is preferably 0.1 to 10.0 folds by mass.

Hereinafter, the content ratio (by mass) of 1-[4-(2-hydroxyethoxy)-phenyl]-2-hydroxy-2-methyl-1-propane-1-one with respect to the specific polymerization initiator is also referred to as the "mass ratio [(1-[4-(2-hydroxyethoxy)-phenyl]-2-hydroxy-2-methyl-1-propane-1-one)/specific polymerization initiator]".

When this mass ratio [(1-[4-(2-hydroxyethoxy)-phenyl]-2-hydroxy-2-methyl-1-propane-1-one)/specific polymerization initiator] is 0.1 or more, the scratch resistance of an image can be further improved, and the image irregularity can be further suppressed.

When this mass ratio [(1-[4-(2-hydroxyethoxy)-phenyl]-2-hydroxy-2-methyl-1-propane-1-one)/specific polymerization initiator] is 10.0 or less, generation of a precipitate under a low temperature environment can be further suppressed.

Particularly, if this mass ratio [(1-[4-(2-hydroxyethoxy)-phenyl]-2-hydroxy-2-methyl-1-propane-1-one)/specific polymerization initiator] is 0.1 to 3.0 (more preferably 0.2 to 3.0, and further preferably 0.3 to 3.0), this is preferable in the points that each of advantages is exerted, and generation of a precipitate under a low temperature environment can be further suppressed, and in addition, the sensitivity is further improved, the scratch resistance of an image is further improved, and the image irregularity can be further suppressed.

Examples of a commercial product of 1-[4-(2-hydroxyethoxy)-phenyl]-2-hydroxy-2-methyl-1-propane-1-one on the market may include IRGACURE 2959 (manufactured by BASF Japan Ltd.) and the like.

In addition, the ink composition of the invention may further contain 2-hydroxy-2-methyl-1-phenyl-propane-1-one in addition to a specific polymerization initiator.

Examples of a commercial product of 2-hydroxy-2-methyl-1-phenyl-propane-1-one on the market, may include DAROCUR 1173 (manufactured by BASF Japan Ltd.) and the like.

In this case, a preferred range of the content ratio (by mass) of 2-hydroxy-2-methyl-1-propane-1-one with respect to the specific polymerization initiator is the same as the preferred range of the mass ratio [(1-[4-(2-hydroxyethoxy)-phenyl]-2-hydroxy-2-methyl-1-propane-1-one)/specific polymerization initiator].

In addition, the ink composition of the invention may contain a specific polymerization initiator, 1-[4-(2-hydroxyethoxy)-phenyl]-2-hydroxy-2-methyl-1-propane-1-one, and 2-hydroxy-2-methyl-1-phenyl-propane-1-one.

In this case, a preferred range of the content ratio (by mass) of 1-[4-(2-hydroxyethoxy)-phenyl]-2-hydroxy-2-methyl-1-propane-1-one and 2-hydroxy-2-methyl-1-phenyl-propane-1-one with respect to the specific polymerization initiator is the same as the preferred range of the mass ratio [(1-[4-(2-hydroxyethoxy)-phenyl]-2-hydroxy-2-methyl-1-propane-1-one)/specific polymerization initiator].

The ink composition of the invention may contain other polymerization initiators besides those mentioned above.

Basically, the other polymerization initiators may be suitably selected from compounds that can initiate polymerization reaction by an active energy ray. For example, a polymerization initiator generating active species (radical, acid, base and the like) by radiation or light, or electron beam (for example, a photopolymerization initiator and the like) may be used.

Examples of the other polymerization initiator include a hydroxyalkylphenone-based initiator, an acetophenone-based initiator, a benzophenone-based initiator, a benzoin-based initiator, a benzoin ether-based initiator, an amino-alkylphenone-based initiator, a xanthone-based initiator, an oxime-based initiator.

For example, examples of the hydroxyalkylphenone-based initiator include 1-hydroxycyclohexylphenyl ketone, 1-(4-isopropylphenyl)-2-hydroxy-2-methylpropane-1-one.

Examples of the acetophenone-based initiator include acetophenone, 2,2-diethoxyacetophenone, p-dimethyl aminoacetophen.

Examples of the benzophenone-based initiator include benzophenone, 2-chlorobenzophenone, p,p'-dichlorobenzophen, p,p'-bisdiethyl aminobenzophenone, Michler's ketone.

Examples of the benzoin-based initiator and benzoin ether-based initiator include benzoin, benzoin methyl ether, benzoin ethyl ether, benzoin isopropyl ether, benzoin n-propyl ether, benzoin isobutyl ether, benzoin n-butyl ether.

The content of the total polymerization initiators (the total content of two or more kinds when the two or more kinds are used) in the ink composition of the invention is preferably 0.3% by mass to 10.0% by mass, more preferably 0.5% by mass to 7.0% by mass, and particularly preferably 0.8% by mass to 5.0% by mass.

In a case in which the content of the total polymerization initiators is 0.3% by mass or more, the sensitivity is further improved, and the image intensity is further improved.

In a case in which the content is 10% by mass or less, generation of the precipitate under a low temperature environment can be further suppressed. Furthermore, the total amount of non-volatile components can be reduced, which further improves the image intensity.

<Polymer Particles>

The ink composition of the invention contains at least one kind of polymer particles having a glass transition temperature of 90° C. or higher (specific polymer particles).

The specific polymer particles are different from the polymer dispersant to be described below (polymer dispersant coating at least a portion of the pigment), and particles that are present separately from the pigment, and more specifically particles that constitute a polymer having a glass transition temperature of 90° C. or higher (hereinafter, also referred to as "specific polymer").

In the ink composition of the invention, since the glass transition temperature of the polymer particles contained is 90° C. or higher, the scratch resistance of an image is improved, and the image irregularity is suppressed. A preferred range of the glass transition temperature is as described above.

For example, in a case in which the ink composition is applied on a recording medium together with a process liquid described below to form an image, the specific polymer particles have a function of immobilizing the ink composition by being dispersed, destabilized, flocculated, and thickened in the ink composition at the time when the ink composition is brought into contact with the process liquid or a region at which the process liquid has been dried. Accordingly, the scratch resistance of an image is further improved, and the image irregularity is further suppressed. Furthermore, adhesion of the ink composition to the recording medium and the scratch resistance of an image are further improved.

The glass transition temperature (Tg) of the specific polymer particles can be suitably controlled by an ordinarily used method. For example, the glass transition temperature (Tg) of the specific polymer particles can be controlled to a desired range by suitably selecting the kind or the configuration ratio of monomers (polymerizable compound) that constitute the specific polymer particles, the molecular weight of polymers that constitute the specific polymer particles, and the like.

As the glass transition temperature (Tg) of the polymer particles in the invention, measured Tg that is obtained by actual measurement is applied.

Specifically, the measured Tg means a value measured using EXSTAR6220, differential scanning calorimetry (DSC) manufactured by SII NanoTechnology Inc. at ordinary measurement conditions. However, when the measurement is difficult due to polymer decomposition or the like, calculated Tg that is computed with the calculation formula below is applied. The calculated Tg is calculated with the equation (1) below.

$$1/Tg = \Sigma(X_i/Tg_i) \quad (1)$$

Herein, the polymer that is the subject for the calculation is assumed to be those in which n kinds of monomer components from i=1 to i=n are copolymerized. $X_i$ is the weight fraction of the i-th monomer ($\Sigma X_i = 1$), and $Tg_i$ is the glass transition temperature (absolute temperature) of a homopolymer of the i-th monomer. Herein, E is the sum of i=1 to i=n. Meanwhile, as the value ($Tg_i$) of the glass transition temperature of a homopolymer of each monomer, adopted is the value of Polymer Handbook (3rd Edition) (written by J. Brandrup and E. H. Immergut (Wiley-Interscience, 1989)).

The specific polymer particles are preferably polymer particles obtained by phase-transfer emulsification method, and more preferably the self-dispersive polymer particles below (self-dispersive polymer particles).

Herein, the self-dispersive polymer refers to a water-insoluble polymer that can be in a state of a dispersion in an aqueous medium by a functional group (particularly acidic group or a salt thereof) contained in the polymer itself when the polymer is in a state of a dispersion by phase-transfer emulsification method in the absence of a surfactant.

Herein, the dispersion state includes both of the emulsion state (emulsion) in which a water-insoluble polymer is dispersed in an aqueous medium in the liquid state, and the dispersion state (suspension) in which a water-insoluble polymer is dispersed in an aqueous medium in the solid state.

In addition, the "water-insoluble" refers that the dissolution amount with respect to 100 mass parts of water (25° C.) is 5.0 mass parts or less.

Examples of the phase-transfer emulsification method include a method in which a polymer is dissolved or dispersed in a solvent (for example, water-soluble solvent and the like), and then placed into water as it is without addition of a surfactant, and a salt generation group (for example, acidic group) contained in the polymer is neutralized, stirred and mixed, and the solvent is removed, and then an aqueous dispersion in a state of emulsion or dispersion is obtained.

As the self-dispersive polymer particles, those having a glass transition temperature of 90° C. or higher may be selected and used from the self-dispersive polymer particles described in paragraphs [0090] to [0121] of JP-A No. 2010-64480 and paragraphs [0130] to of JP-A No. 2011-068085.

A polymer constituting the specific polymer particles (referred to as the specific polymer below) preferably has at least one of a structural unit having an aromatic group or a structural unit having an alicyclic group. Herein, the alicyclic group has the same meaning as a cyclic aliphatic group.

Accordingly, it is possible to further improve the intensity of the formed image (for example, the scratch resistance and blocking resistance).

Meanwhile, the structural unit included in the specific polymer may be referred to as a "structural component" in the specification.

(Structural Unit Having Aromatic Group)

Examples of the structural unit having an aromatic group include a structural unit having a phenyl group, a structural unit having a benzyl group, a structural unit having a phenoxy group, a structural unit having a phenethyl group. Among them, the structural unit having a benzyl group, or the structural unit having a phenoxy group (preferably a structural unit having a phenoxyethyl group) is preferable.

The structural unit having an aromatic group is preferably a structural unit derived from a monomer having an aromatic group (hereinafter, also referred to as an "aromatic group-containing monomer").

The aromatic group-containing monomer is preferably a monomer having an aromatic group derived from an aromatic hydrocarbon and an ethylenic unsaturated bond. The aromatic group-containing monomer may be used in one kind alone, or may be used in two or more kinds in combination.

Examples of the aromatic group-containing monomer include an aromatic group-containing (meth)acrylate monomer (for example, phenoxyethyl (meth)acrylate, benzyl (meth)acrylate, phenyl (meth)acrylate, and the like), a styrene-based monomer. Among them, the aromatic group-containing monomer is preferably an aromatic group-containing (meth)acrylate monomer, more preferably at least one kind selected from phenoxyethyl (meth)acrylate, benzyl (meth)acrylate or phenyl (meth)acrylate, and further preferably phenoxyethyl (meth)acrylate or benzyl (meth)acrylate from the viewpoint of a balance of hydrophilicity and hydrophobicity of the polymer chain, and the ink fixing property.

Meanwhile, the "(meth)acrylate" means acrylate or methacrylate.

(Structural Unit Having Alicyclic Group)

The structural unit having an alicyclic group is preferably a structural unit derived from a monomer having an alicyclic group (hereinafter, also referred to as an "alicyclic group-containing monomer").

The alicyclic group-containing monomer is preferably a monomer having an alicyclic group and an ethylenic unsaturated bond, and more preferably (meth)acrylate having an alicyclic group (hereinafter, also referred to as an "alicyclic (meth)acrylate").

The alicyclic (meth)acrylate has a structure that contains a structural moiety derived from (meth)acrylic acid and a structural moiety derived from alcohol, and the structural moiety derived from alcohol contains at least one alicyclic hydrocarbon group which may not be substituted or may be substituted. Meanwhile, the alicyclic hydrocarbon group may be the structural moiety derived from alcohol itself, or may be bonded to the structural moiety derived from alcohol through a linking group.

The alicyclic hydrocarbon group is not particularly limited if it contains cyclic non-aromatic hydrocarbon groups, and examples thereof include a monocyclic hydrocarbon group, a bicyclic hydrocarbon group, and a polycyclic hydrocarbon group of a tricyclic or higher-cyclic hydrocarbon group. Examples of the alicyclic hydrocarbon group may include a cycloalkyl group such as a cyclopentyl group and a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and bicyclo[4.3.0]nonane.

The alicyclic hydrocarbon group may further have a substituent. Examples of the substituent include alkyl group, an alkenyl group, an aryl group, an aralkyl group, an alkoxy group, a hydroxy group, a primary amino group, a secondary amino group, a tertiary amino group, an alkylcarbonyl or arylcarbonyl group, and a cyano group. In addition, the alicyclic hydrocarbon group may further form a condensed ring. The alicyclic hydrocarbon group in the invention preferably has a carbon atom number of 5 to 20 in the moiety of the alicyclic hydrocarbon group from the viewpoint of viscosity and solubility.

Specific examples of alicyclic (meth)acrylate are shown below, but the invention is not limited thereto.

Examples of the monocyclic (meth)acrylate include cycloalkyl (meth)acrylates having a carbon atom number of 3 to 10 for the cycloalkyl group, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate and cyclodecyl (meth)acrylate.

Examples of the bicyclic (meth)acrylate include isobornyl (meth)acrylate, norbornyl (meth)acrylate.

Examples of the tricyclic (meth)acrylate include adamantyl (meth)acrylate, dicyclopentanyl (meth)acrylate, dicyclopentenyloxyethyl (meth)acrylate and the like.

Each of these may be used alone or may be used in a combination of two or more kinds.

Among these, the (meth)acrylate is preferably at least one kind of bicyclic (meth)acrylate or polycyclic (meth)acrylate of tricyclic or higher-cyclic (meth)acrylate, and more preferably at least one kind selected from isobornyl (meth)acrylate, adamantyl (meth)acrylate, or dicyclopentanyl (meth)acrylate from the viewpoint of dispersion stability, fixing property and blocking resistance of the self-dispersive polymer particles.

The total content of the above-mentioned structural unit having an aromatic group and the above-mentioned structural unit having an alicyclic group in the polymer constituting the specific polymer particles of the invention is preferably 3% by mass to 95% by mass. When the total content is in this range, the stability of the state of the self-emulsification or dispersion is improved, and further increase of the viscosity of the ink can be suppressed.

In addition, the specific polymer particles more preferably have a structural unit having an aromatic group in consideration of removability (maintenance) of the ink composition from a nozzle and re-discharge property after the removal.

In a further preferred embodiment of the specific polymer, the polymer that constitutes the specific polymer particles contains the structural unit having an aromatic group, and the content of the structural unit having an aromatic group is 3% by mass to 45% by mass (more preferably 3 to 40% by mass, and particularly preferably 5 to 30% by mass) with respect to the total amount of the polymer.

In this embodiment, the glass transition temperature of the specific polymer particles is further easily adjusted to 90° C. or higher.

(Hydrophilic Structural Unit)

The polymer that constitutes the specific polymer particles preferably contains a hydrophilic structural unit from the viewpoint of the dispersibility in the ink composition (self-dispersibility when the specific polymer particles are the self-dispersive polymer particles).

The hydrophilic structural unit is preferably a structural unit derived from a monomer having a hydrophilic group (hereinafter, also referred to as a "hydrophilic group-containing monomer").

In this case, the hydrophilic structural unit may be derived from one kind of a hydrophilic group-containing monomer, or may be derived from two or more kinds of hydrophilic group-containing monomers.

The hydrophilic group is not particularly limited, and may be a dissociative group or a nonionic hydrophilic group.

The hydrophilic group is preferably a dissociative group, and more preferably an anionic dissociative group from the viewpoint of promotion of the self-dispersion and from the viewpoint of the stability of the state of the formed emulsion or dispersion. Examples of the dissociative group include a carboxyl group, a phosphoric acid group, a sulfonic acid group. Among them, the dissociative group is preferably a carboxyl group from the viewpoint of the fixing property when the polymer particles constitute the ink composition.

The hydrophilic group-containing monomer is preferably a dissociative group-containing monomer, and preferably a dissociative group-containing monomer having a dissociative group and an ethylenic unsaturated bond from the viewpoint of the self-dispersion and the flocculation.

Examples of the dissociative group-containing monomer include an unsaturated carboxylic acid monomer, an unsaturated sulfonic acid monomer, an unsaturated phosphoric acid monomer.

Examples of the unsaturated carboxylic acid monomer include, specifically, (meth)acrylic acid, crotonic acid, itaconic acid, maleic acid, fumaric acid, citraconic acid, 2-methacryloyloxymethyl succinic acid.

Examples of the unsaturated sulfonic acid monomer include, specifically, styrene sulfonic acid, 2-acrylamide-2-methylpropanesulfonic acid, 3-sulfopropyl (meth)acrylate, bis-(3-sulfopropyl)-itaconic acid ester.

Examples of the unsaturated phosphoric acid monomer include, specifically, vinyl phosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate.

The dissociative group-containing monomer is preferably an unsaturated carboxylic acid monomer, and more preferably (meth)acrylic acid from the viewpoint of the dispersion stability and the discharge stability.

The content of the hydrophilic structural unit in the polymer that constitutes the specific polymer particles is not particularly limited, but the content is preferably 2% by mass to 30% by mass, more preferably 5% by mass to 20% by mass, and particularly preferably 5% by mass to 15% by mass with respect to the total amount of the specific polymer particles from the viewpoint of the dispersion stability.

(Structural Unit Having Alkyl Group)

The polymer that constitutes the specific polymer particles preferably contains a structural unit having an alkyl group from the viewpoint of the flexibility of the polymer skeleton and easy control of the glass transition temperature (Tg).

The carbon atom number of the alkyl group in the structural unit having the alkyl group is preferably 1 to 4.

The structural unit having an alkyl group is preferably a structural unit derived from a monomer having an alkyl group (hereinafter, also referred to as an "alkyl group-containing monomer").

Examples of the alkyl group-containing monomer include, for example, alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate and ethylhexyl (meth)acrylate; ethylenic unsaturated monomers having a hydroxy group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate and hydroxyhexyl (meth)acrylate; dialkylaminoalkyl (meth)acrylates such as dimethylaminoethyl (meth)acrylate; (meth)acrylamides including N-hydroxyalkyl (meth)acrylamides such as N-hydroxymethyl (meth)acrylamide, N-hydroxyethyl (meth)acrylamide and N-hydroxybutyl (meth)acrylamide; N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide and N-(n-, iso)butoxyethyl (meth)acrylamide.

Among them, the alkyl group-containing monomer is preferably alkyl (meth)acrylate, more preferably alkyl (meth)acrylate having a carbon atom number of from 1 to 4 in the alkyl group, further preferably methyl (meth)acrylate or ethyl (meth)acrylate, and particularly preferably methyl (meth)acrylate.

The content of the structural unit having an alkyl group in the polymer that constitutes the specific polymer particles is not particularly limited, but the content is preferably 5% by mass to 90% by mass, more preferably 30% by mass to 90% by mass, further preferably 40% by mass to 90% by mass, particularly preferably 50% by mass to 90% by mass, and most preferably 60% by mass to 85% by mass with respect to the total amount of the specific polymer particles from the viewpoint of the dispersion stability.

The polymer that constitutes the specific polymer particles may contain another structural unit besides the structural units described above as necessary.

A preferred embodiment of the copolymerization ratio of the polymer that constitutes the specific polymer particles is as an embodiment below from the viewpoints of easy adjustment of the glass transition temperature to 90° C. or higher, and favorite maintenance of the dispersion stability.

That is, in a preferred embodiment from the above described viewpoints, the polymer that constitutes the specific polymer particles contains a structural unit having an aromatic group (preferably, a benzyl group, a phenoxy group) in a copolymerization ratio of 3% by mass to 45% by mass (more preferably 3 to 40% by mass, particularly preferably 5 to 30% by mass), the hydrophilic structural unit in a copolymerization ratio of 2% by mass to 30% by mass (more preferably 5% by mass to 20% by mass, particularly preferably 5% by mass to 15% by mass), and the structural unit having an alkyl group in a copolymerization ratio of 5% by mass to 90% by mass (more preferably 30% by mass to 90% by mass, and further preferably 50% by mass to 90% by mass, particularly preferably 60% by mass to 85% by mass).

In a further preferred embodiment, the polymer that constitutes the specific polymer particles contains at least one of a structural unit derived from benzyl (meth)acrylate or a structural unit derived from phenoxyethyl (meth)acrylate in a copolymerization ratio of 3% by mass to 45% by mass (more preferably 3 to 40% by mass, particularly preferably 5 to 30% by mass), a structural unit derived from (meth)acrylic acid in a copolymerization ratio of 2% by mass to 30% by mass (more preferably 5% by mass to 20% by mass, particularly preferably 5% by mass to 15% by mass), and a structural unit derived from alkyl (meth)acrylate in a copolymerization ratio of 40% by mass to 90% by mass (more preferably 50% by mass to 90% by mass, particularly preferably 60% by mass to 85% by mass).

The range of the molecular weight of the polymer that constitutes the specific polymer particles is preferably 3,000 to 200,000, more preferably 5,000 to 150,000, and further preferably 10,000 to 100,000 by weight average molecular weight. By setting weight average molecular weight to 3,000 or more, it is possible to effectively suppress the amount of water-soluble components. In addition, by setting weight average molecular weight to 200,000 or less, it is possible to enhance the self-dispersion stability.

Meanwhile, weight average molecular weight of the polymer that constitutes the specific polymer particles is measured with gel permeation chromatography (GPC). As for GPC, HLC-8020GPC (manufactured by TOSOH CORPORATION) is used, and three pieces of TSKGEL, SUPER MULTIPORE HZ-H (manufactured by TOSOH CORPORATION, 4.6 mm ID×15 cm) are used as a column, and THF (tetrahydrofuran) is used as an eluent. In addition, as the conditions, the sample density is 0.45% by mass, the flow velocity is 0.35 ml/min, the sample injection amount is 10 µl, and the measurement temperature is 40° C., and an IR detector is used. In addition, the calibration curve is produced from 8 samples of "standard sample TSK standard, polystyrene": "F-40", "F-20", "F-4", "F-1", "A-5000", "A-2500", "A-1000", and "n-propyl benzene" manufactured by TOSOH CORPORATION.

The average particle diameter of the specific polymer particles (particularly, self-dispersive polymer particles) in the invention is preferably in a range of 10 to 400 nm, more preferably in a range of 10 to 200 nm, further preferably in a range of 10 to 100 nm, and particularly preferably in a range of 10 to 50 nm by volume average particle diameter. When volume average particle diameter is 10 nm or more, the aptitude for manufacture is improved. In addition, when volume average particle diameter is 400 nm or less, the preservation stability is improved. In addition, the particle diameter distribution of the polymer particles is not particularly limited, but may be those having a broad particle diameter distribution or may be those having mono-dispersion particle diameter distribution. In addition, the polymer particles may be used in a mixture of two or more kinds.

Meanwhile, average particle diameter and particle diameter distribution of the specific polymer particles are obtained by measuring the volume average particle diameter by dynamic light scattering using Nanotrac particle size distribution measurement device UPA-EX150 (manufactured by NIKKISO CO., LTD.).

The content of the specific polymer particles described above (preferably self-dispersive polymer particles) in the ink composition (the total content when the two or more kinds are used) is not particularly limited, but is preferably 0.3% by mass to 10.0% by mass, more preferably 0.5% by mass to 7.0% by mass, and particularly preferably 1.0% by mass to 5.0% by mass with respect to the total amount of the ink composition.

When the content is 0.3% by mass or more, the scratch resistance of an image can be further improved, and the image irregularity can be further suppressed.

When the content is 10.0% by mass or less, the discharge property of the ink can be further improved, and it is also advantageous in the point that generation of the precipitate under a low temperature environment can be suppressed.

<Polymerizable Compound>

The ink composition of the invention contains at least one kind of polymerizable compounds.

The ink composition of the invention is cured by polymerizing the polymerizable compound contained in the ink composition when the ink composition is applied on a recording medium. This reinforces the image formed using the ink composition of the invention.

The polymerizable compound is preferably a water-soluble polymerizable compound.

Herein, the "water-soluble" refers that the polymerizable compound can be dissolved in water at a certain or higher concentration. Specifically, the solubility with respect to 25° C. water is preferably 5% by mass or more, and more preferably 10% by mass or more. In addition, the water-soluble polymerizable compound preferably dissolves in an aqueous ink composition (desirably uniformly). In addition, the water-soluble polymerizable compound may dissolve in the ink composition (desirably uniformly) by adding the water-soluble solvent described below to increase the solubility.

The polymerizable compound is not particularly limited, and may be a monofunctional polymerizable compound or may be a multi-functional polymerizable compound.

A multi-functional polymerizable compound is preferable in the points that the polymerizability and the polymerization efficiency when curing the image by irradiation of an active energy ray are high, and the friction resistance of the formed image is enhanced.

In addition, the polymerizable compound is preferably a (meth)acrylamide compound.

Meanwhile, "(meth)acrylamide compound" means a compound of at least one of a methacrylamide compound or an acrylamide compound. The (meth)acrylamide compound is a compound that has a structure of (meth)acrylamide in the molecule, and polymerized by irradiation of an active energy ray.

The polymerizable compound is suitably a multi-functional (meth)acrylamide compound from the points described above.

Among multi-functional (meth)acrylamide compounds, a (meth)acrylamide compound represented by Formula (1) below (hereinafter, also simply referred to as the "compound represented by Formula (1)") is particularly preferable in the points of having high polymerization performance and curing performance.

The compound has four acrylamide groups or methacrylamide groups as a polymerizable group in the molecule. In addition, the compound exhibits curability based on polymerization reaction by irradiation of an active energy ray such as an α-ray, a γ-ray, an X-ray, an ultraviolet ray, a visible ray, an infrared ray and an electron beam and energy such as heat. The compound represented by Formula (1) exhibits water-solubility, and dissolves well in a water-soluble solvent such as water and alcohol.

In addition, the compound represented by Formula (1) is also preferred from the viewpoint of the discharge property of the ink (particularly, the consecutive discharge property).

((Meth)Acrylamide Compound Represented by Formula (1))

At least one kind of the polymerizable compound in the ink composition of the invention is preferably a (meth)acrylamide compound represented by Formula (1) below as described above.

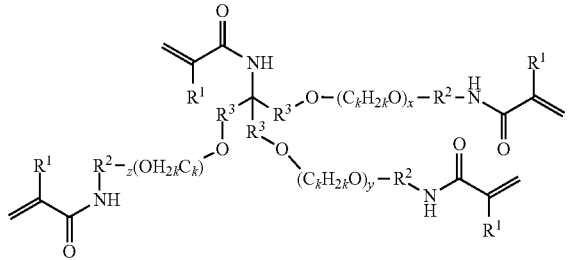

Formula (1)

In Formula (1), $R^1$ represents a hydrogen atom or a methyl group. $R^2$ represents a linear or branched alkylene group having from 2 to 4 carbon atoms, provided that, $R^2$ does not have a structure in which an oxygen atom and a nitrogen atom bonded to both ends of $R^2$ are bonded to an identical carbon atom of $R^2$. $R^3$ represents a divalent linking group. k represents 2 or 3. Each of x, y and z independently represents an integer from 0 to 6, and x+y+z equals 0 to 18.

In Formula (1), $R^1$ represents a hydrogen atom or a methyl group. Plural $R^1$s may be the same or different from each other. $R^1$ is preferably a hydrogen atom.

In Formula (1), $R^2$ represents a linear or branched alkylene group having from 2 to 4 carbon atoms. Plural $R^2$s may be the same or different from each other. $R^2$ is preferably an alkylene group having from 3 to 4 carbon atoms, more preferably an alkylene group having from 3 carbon atoms, and particularly preferably a linear alkylene group having from 3 carbon atoms. An alkylene group of $R^2$ may further have a substituent, and examples of the substituent include an aryl group, and an alkoxy group.

Provided that, $R^2$ does not have a structure in which an oxygen atom and a nitrogen atom bonded to both ends of $R^2$ are bonded to an identical carbon atom of $R^2$. $R^2$ is a linear or branched alkylene group linking the oxygen atom with the nitrogen atom of the (meth)acrylamide group. In a case in which the alkylene group has a branched structure, it might be conceivable that the oxygen atom and the nitrogen atom of the (meth)acrylamide group at both ends are bonded to an identical carbon atom in the alkylene group, to take a —O—C—N— structure (hemiaminal structure). However, a compound represented by Formula (1) does not include a compound having such a structure. This can suppress decomposition at the position of the carbon atom of the —O—C—N— structure, and further improve the preservation stability of the ink composition.

In Formula (1), $R^3$ represents a divalent linking group. Examples of the divalent linking group of $R^3$ include an alkylene group, an arylene group, a heterocyclic group, or a combination thereof, and preferably an alkylene group. Meanwhile, in a case in which the divalent linking group includes an alkylene group, the alkylene group may further contain at least one kind group selected from —O—, —S—, or —NR$^a$—. R$^a$ represents a hydrogen atom or an alkyl group having from 1 to 4 carbon atoms.

In a case in which $R^3$ includes an alkylene group, examples of the alkylene group include a methylene group, an ethylene group, a propylene group, a butylene group, a pentylene group, a hexylene group, a heptylene group, an octylene group and a nonylene group. The carbon atom number of the alkylene group of $R^3$ is preferably 1 to 6, further preferably 1 to 3, and particularly preferably 1.

An alkylene group of $R^3$ may further contain at least one kind selected from —O—, —S—, or —NR$^a$—, and examples of the alkylene group containing —O— include —C$_2$H$_4$—O—C$_2$H$_4$— and —C$_3$H$_6$—O—C$_3$H$_6$—.

An alkylene group of $R^3$ may further have a substituent, and examples of the substituent include an aryl group and an alkoxy group.

In a case in which $R^3$ includes an arylene group, examples of the arylene group include a phenylene group and a naphthylene group. The carbon atom number of the arylene group of $R^3$ is preferably 6 to 14, further preferably 6 to 10, and particularly preferably 6.

An arylene group of $R^3$ may further have a substituent, and examples of the substituent include an alkyl group and an alkoxy group.

In a case in which $R^3$ includes a heterocyclic group, the heterocyclic group is preferably a 5-membered or 6-membered ring, which may be further condensed. In addition, a heterocyclic group may be an aromatic heterocycle or a non-aromatic heterocycle. Examples of the heterocyclic group when $R^3$ contains the heterocyclic group, include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidazolidine and thiazoline. Among them, the heterocyclic group is preferably an aromatic heterocyclic group, and is preferably pyridine, pyrazine, pyrimidine, pyridazine, triazine, pyrazole, imidazole, benzimidazole, triazole, thiazole, benzothiazole, isothiazole, benzisothiazole or thiadiazole. Meanwhile, the heterocyclic group described above has been exemplified in a form skipped with the substitution position, but the substitution position is not limited. For example, if the heterocyclic group is pyridine, the heterocyclic group may be substituted at the 2-position, the 3-position, or the 4-position, and these substituents can be all included. The heterocyclic group may further have a substituent, and examples of the substituent include an alkyl group, an aryl group and an alkoxy group.

In Formula (1), k represents 2 or 3. Plural k's may be the same or different from each other. In addition, $C_kH_{2k}$ may be a linear structure or a branched structure.

In Formula (1), each of x, y and z independently represents an integer from 0 to 6, preferably an integer from 0 to 5, and more preferably an integer from 0 to 3. In addition, x+y+z equals 0 to 18, preferably 0 to 15, and more preferably 0 to 9.

Specific examples of a compound represented by Formula (1) (polymerizable compounds a to f) are shown in below, but a compound represented by Formula (1) is not limited thereto.

Polymerization compound a

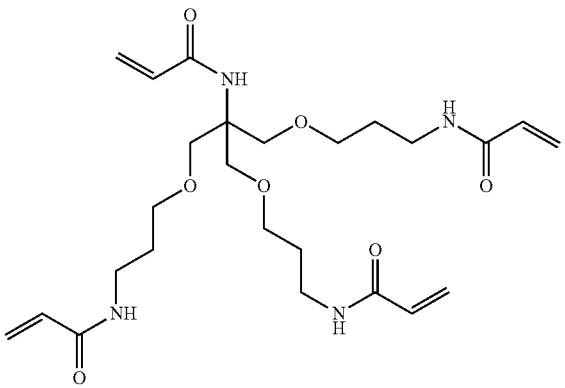

Polymerization compound b

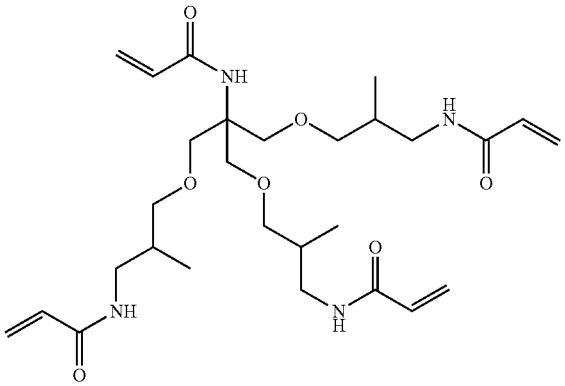

Polymerizable compound c

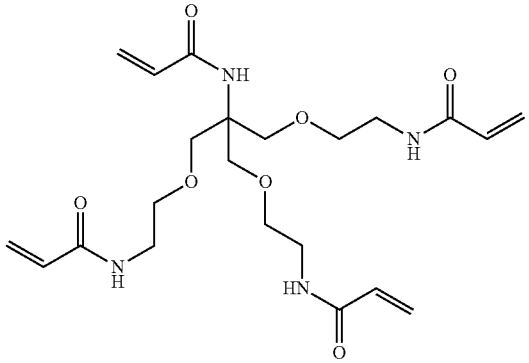

Polymerization compound d

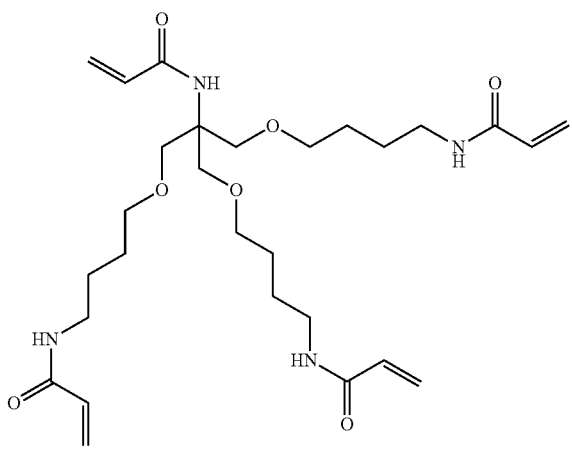

Polymerization compound e

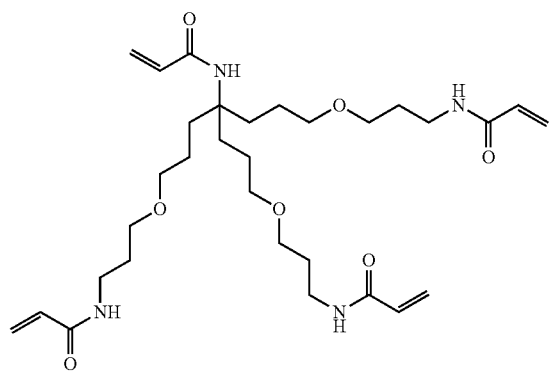

Polymerization compound f

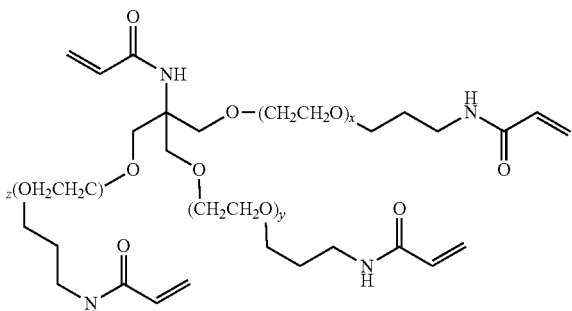

x + y + z = 9

A synthesis method for preparing a compound represented by Formula (1) is not particularly limited, but for example, a compound represented by Formula (1) can be synthesized by the method described in paragraphs [0028] to [0033] and paragraphs [0123] to [0139] of JP-A No. 2013-18846.

In a case in which the ink composition of the invention contains a compound represented by Formula (1) described above, the ink composition may contain only one kind, or two or more kinds of a compound represented by Formula (1).

In a case in which the ink composition of the invention contains a compound represented by Formula (1) described above, a content of a compound represented by Formula (1) is preferably 0.1 to 45% by mass, more preferably 1 to 30% by mass, and particularly preferably 2 to 20% by mass with respect to a total amount of the ink composition. When a content of a compound represented by Formula (1) is in the range, the curability and the preservation stability of the ink composition are further improved.

The above described content is more preferably 3% by mass or more, further preferably 5% by mass or more, and particularly preferably 7% by mass or more from the viewpoint of the curability.

In addition, in the ink composition of the invention, a ratio of a (meth)acrylamide compound represented by Formula (1) included in the total polymerizable compounds contained in the ink composition, is preferably 50% by mass or more (more preferably 70% by mass or more, further preferably 80% by mass or more, and particularly preferably 90% by mass or more).

In this embodiment, the ink composition of the invention is remarkably excellent in the curability and the consecutive discharge property of the ink.

((Meth)Acrylamide Compound Represented by Formula (2))

The ink composition of the invention may contain at least one (meth)acrylamide compound represented by the following Formula (2) (hereinafter, also referred to as the "compound represented by Formula (2)"), whereby flexibility of an image can be further improved.

In the ink composition of the invention, for example, a compound represented by Formula (1) described above and a compound represented by the following Formula (2) may be used in combination.

Formula (2)

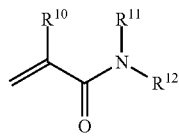

In Formula (2), $R^{10}$ represents a hydrogen atom or a methyl group, $R^{11}$ represents a hydrogen atom, a methyl group or an ethyl group, and $R^{12}$ represents a substituted or unsubstituted alkyl group. $R^{11}$ and $R^{12}$ may be bonded to each other to form a 5- to 8-membered ring, and the 5- to 8-membered ring may further contain at least one selected from —O—, —S—, or —$NR^b$—. $R^b$ represents a hydrogen atom or an alkyl group having from 1 to 4 carbon atoms.

In Formula (2), $R^{10}$ represents a hydrogen atom or a methyl group, and is preferably a hydrogen atom.

$R^{11}$ represents a hydrogen atom, a methyl group or an ethyl group, and is preferably a hydrogen atom or a methyl group, and more preferably a hydrogen atom.

$R^{12}$ represents a substituted or unsubstituted alkyl group. The alkyl group of $R^{12}$ is preferably a linear or branched alkyl group having from 1 to 6 carbon atoms (for example, a methyl group, an ethyl group, a propyl group, a butyl group, a pentyl group, a hexyl group), more preferably an alkyl group having from 2 to 4 carbon atoms, and particularly preferably an alkyl group having from 2 or 3 carbon atoms.

Specific examples of a compound represented by Formula (2) include the exemplary compounds (C-1) to (C-13) below, but a compound represented by Formula (2) is not limited thereto.

(C-1): Diacetone acrylamide (manufactured by Nippon Kasei Chemical Co., Ltd)

(C-2): Hydroxyethylacrylamide (manufactured by KOHJIN Holdings Co., Ltd)

(C-3): Hydroxypropylacrylamide (manufactured by Fluka company)

(C-4): N-[1,1-bis(hydroxymethyl)-2-hydroxyethyl]propene amide (manufactured by Sigma-Aldrich Co. LLC.)

(C-5): N-(2-dimethylaminoethyl)acrylamide (manufactured by Sigma-Aldrich Co. LLC.)

(C-6): Dimethylaminopropylacrylamide (manufactured by KOHJIN Holdings Co., Ltd)

(C-7): 2-(acryloyloxy)-N,N,N-trimethylethane aminium chloride (manufactured by KOHJIN Holdings Co., Ltd)

(C-8): (3-acrylamide propyl)trimethyl ammonium chloride (manufactured by KOHJIN Holdings Co., Ltd)

(C-9): 2-Acrylamide-2-methylpropanesulfonic acid (manufactured by TOAGOSEI CO., LTD.)

(C-10): N-[1,1-dimethyl-2-(sodiooxysulfonyl)ethyl]acrylamide (manufactured by Sigma-Aldrich Co. LLC.)

(C-11): N,N-dimethylacrylamide (manufactured by KOHJIN Holdings Co., Ltd)

(C-12): N,N-diethylacrylamide (manufactured by KOHJIN Holdings Co., Ltd)

(C-13): 4-acryloylmorpholine (manufactured by KOHJIN Holdings Co., Ltd)

In a case in which the ink composition of the invention contains a compound represented by Formula (2) described above, the ink composition may contain only one kind of the compound represented by Formula (2), or may contain two or more kinds of the compound represented by Formula (2).

In a case in which the ink composition of the invention contains a compound represented by Formula (2) described above, a compound represented by Formula (2) has the same preferable definition as the content of a compound in Formula (1) described above.

In the ink composition of the invention, a compound represented by Formula (1) and a compound represented by Formula (2) may be used in combination as described above.

In this regard, a mass ratio [compound represented by Formula (1): compound represented by Formula (2)] is preferably 100:0 to 50:50, more preferably 100:0 to 70:30, further preferably 100:0 to 80:20, particularly preferably 100:0 to 90:10, and most preferably 100:0 from the viewpoint of further improving the consecutive discharge property of the ink.

When a mass ratio is 100:0 to 50:50, the properties of a compound represented by Formula (1) are further effectively maintained.

Examples of the polymerizable compound in the invention also include other polymerizable compounds besides the compound represented by Formula (1) described above and the compound represented by Formula (2).

In addition, of course, a compound represented by Formula (1) described above (and a compound represented by Formula (2) as needed) and the other polymerizable compound may be used in combination in the invention.

Examples of the other polymerizable compound include, for example, nonionic polymerizable monomers and cationic polymerizable monomers described in paragraphs [0149] to [0169] of the method of JP-A No. 2011-46872.

A content of the polymerizable compound in the ink composition of the invention (the total content when two or more kinds are used) is preferably 0.1 to 45% by mass, more preferably 1 to 30% by mass, and particularly preferably 2 to 20% by mass with respect to the total amount of the ink composition. When a content of the polymerizable compound is in the range, the curability and the preservation stability of the ink composition are further improved.

<Water>

The ink composition of the invention contains water.

A content of water in the ink composition is not particularly limited, and a content may be 50% by mass or more.

Generally, an ink composition having a water content of 50% by mass or more tends to generate a precipitate easily.

However, the ink composition of the invention can have suppressed generation of the precipitate even under a low temperature environment as described above.

Accordingly, the ink composition of the invention can contain water in an amount of 50% by mass or more.

A preferable content of water in the ink composition is preferably 50% by mass to 80% by mass, more preferably 50% by mass to 75% by mass, and further preferably 50% by mass to 70% by mass with respect to the total amount of the ink composition.

<Water-Soluble Solvent>

The ink composition of the invention may contain at least one water-soluble solvent.

As the water-soluble solvent, known water-soluble solvents may be used without particular limitation.

The above described water-soluble solvent is preferably at least one selected from the group consisting of a compound represented by the following Formula (A) and a compound represented by the following Formula (B) from the viewpoint of further suppressing the generation of the precipitate under a low temperature environment.

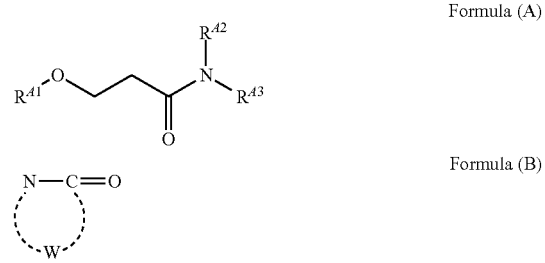

In Formula (A), $R^{41}$ represents a linear or branched alkyl group having from 1 to 6 carbon atoms. Each of $R^{42}$ and $R^{43}$ independently represents a hydrogen atom or a linear or branched alkyl group having from 1 to 4 carbon atoms.

In Formula (B), W represents a divalent linking group that forms a heterocycle together with the carbon atom and the nitrogen atom in Formula (B).

(Compound Represented by Formula (A))

Hereinafter, a compound represented by Formula (A), which is an example of the water-soluble solvent, is explained.

A compound represented by Formula (A) is a β-alkoxy propione amide compound having the structure described above.

A compound represented by Formula (A) can enhance the compatibility of the polymerization initiator with water in the ink composition while maintaining the solubility of the polymerization initiator.

Therefore, in a case in which the ink composition contains a compound represented by Formula (A), a polymerization initiator is hardly precipitated even when the ink composition is placed under the low temperature environment. In addition, a compound represented by Formula (A) has low burden with respect to the environment, and has less bad odor, leading to easy handling of the ink composition.

Examples of linear or branched alkyl group having from 1 to 6 carbon atoms represented by $R^{41}$ in Formula (A) include a methyl group, an ethyl group, a propyl group, an isopropyl group, an n-butyl group, a tert-butyl group, an n-pentyl group and an n-hexyl group.

Examples of linear or branched alkyl group having from 1 to 6 carbon atoms represented by $R^{42}$ or $R^{43}$ in Formula (A) include a methyl group, an ethyl group, a propyl group, an isopropyl group, an n-butyl group and a tert-butyl group.

Among them, the carbon atom number of an alkyl group represented by $R^{41}$ is preferably 3 to 6, and more preferably a propyl group, an isopropyl group, an n-butyl group, a tert-butyl group, an n-pentyl group, or an n-hexyl group.

The carbon atom number of an alkyl group represented by $R^{42}$ or $R^{43}$ is preferably 1 to 3, and more preferably a methyl group or an ethyl group.

Hereinafter, exemplary compounds A-1 to A-33 of a compound represented by Formula (A) are shown, but a compound represented by Formula (A) is not limited thereto.

A-1: 3-methoxy-N,N-dimethylpropione amide
A-2: 3-n-butoxy-N,N-dimethylpropione amide
A-3: 3-ethoxy-N,N-diethylpropione amide
A-4: 3-methoxy-N,N-diethylpropione amide
A-5: 3-methoxy-N,N-monomethylmonoethylpropione amide
A-6: 3-methoxy-N,N-di-n-propylpropione amide
A-7: 3-methoxy-N,N-di-n-butylpropione amide
A-8: 3-methoxy-N,N-di-n-butylpropione amide
A-9: 3-ethoxy-N,N-dimethylpropione amide
A-10: 3-ethoxy-N,N-monomethylmonoethylpropione amide
A-11: 3-ethoxy-N,N-di-n-propylpropione amide
A-12: 3-ethoxy-N,N-di-n-butylpropione amide
A-13: 3-n-butoxy-N,N-diethylpropione amide
A-14: 3-n-butoxy-N,N-monomethylmonoethylpropione amide
A-15: 3-n-butoxy-N,N-di-n-propylpropione amide
A-16: 3-n-butoxy-N,N-di-n-butylpropione amide
A-17: 3-n-propoxy-N,N-dimethylpropione amide
A-18: 3-n-propoxy-N,N-diethylpropione amide
A-19: 3-n-propoxy-N,N-monomethylmonoethylpropione amide
A-20: 3-n-propoxy-N,N-di-n-propylpropione amide
A-21: 3-n-propoxy-N,N-di-n-butylpropione amide
A-22: 3-iso-propoxy-N,N-dimethylpropione amide
A-23: 3-iso-propoxy-N,N-diethylpropione amide
A-24: 3-iso-propoxy-N,N-monomethylmonoethylpropione amide
A-25: 3-iso-propoxy-N,N-di-n-propylpropione amide
A-26: 3-iso-propoxy-N,N-di-n-butylpropione amide
A-27: 3-tert-butoxy-N,N-dimethylpropione amide
A-28: 3-tert-butoxy-N,N-diethylpropione amide
A-29: 3-tert-butoxy-N,N-monomethylmonoethylpropione amide
A-30: 3-tert-butoxy-N,N-di-n-propylpropione amide
A-31: 3-tert-butoxy-N,N-di-n-butylpropione amide
A-32: 3-hexyloxy-N,N-dimethylpropione amide
A-33: 3-hexyloxy-N,N-diethylpropione amide A compound represented by Formula (A) may be used alone, or may be used in two or more in combination.

With respect to a specific method of preparing a compound represented by Formula (A), the compound represented by Formula (A) can be manufactured, for example, on the basis of the synthesis method described in JP-A No. 2009-185079, WO 2008/102615, or the like. In addition, as a compound represented by Formula (A), a commercial product may be also used, and for example, "EQUAMIDE" manufactured by Idemitsu Kosan Co., Ltd. is available.

A compound represented by Formula (A) is most preferably 3-n-butoxy-N,N-dimethylpropione amide (exemplary compound A-2).

(Compound Represented by Formula (B))

Next, a compound represented by Formula (B), which is an example of the water-soluble solvent, is explained.

A compound represented by Formula (B) is a heterocyclic compound having the structure described above.

A compound represented by Formula (B) can also enhance the compatibility of the polymerization initiator with water in the ink composition while maintaining the solubility of a polymerization initiator.

In Formula (B), W represents a divalent linking group that forms a heterocycle together with the carbon atom and the nitrogen atom in Formula (B).

W is preferably an alkylene group.

The alkylene group may be unsubstituted, or may be substituted with a substituent. The substituent is preferably an alkyl group (preferably, a linear, branched, or cyclic alkyl group having from 1 to 6 carbon atoms), a hydroxy group, or a hydroxyalkyl group (preferably, hydroxyalkyl group having from 1 to 6 carbon atoms).

A preferred range of the carbon atom number of the alkylene group (including the carbon atom number of a substituent when the alkylene group has a substituent) is 1 to 10.

In addition, the members of the heterocycle in Formula (B) is preferably 3-members to 6-members.

Specific examples of a compound represented by Formula (B) include 2-pyrrolidone, 1-methyl-2-pyrrolidone, 1-ethyl-2-pyrrolidone, 1-propyl-2-pyrrolidone, 1-butyl-2-pyrrolidone, 1-pentyl-2-pyrrolidone, 1-hexyl-2-pyrrolidone, 1-hydroxyethyl-2-pyrrolidone and 1-cyclohexyl-2-pyrrolidone. 2-pyrrolidone is particularly preferable in view of solubility of a polymerization initiator.

In a case in which an ink composition of the invention contains at least one selected from the group consisting of a compound represented by Formula (A) and a compound represented by Formula (B) as a water-soluble solvent, the total content of a compound represented by Formula (A) and a compound represented by Formula (B) is preferably 2% by mass to 20% by mass with respect to the total amount of the ink composition.

In a case in which the total content is 2% by mass or more, solubility of a polymerization initiator in the ink composition can be further enhanced.

In addition, in a case in which the total content is 20% by mass or less, a polymerizable compound can be sufficiently contained in the ink composition, and thus curability of the ink composition can be enhanced.

A total content is more preferably 3% by mass to 18% by mass, further preferably 4% by mass to 15% by mass, and particularly preferably 5% by mass to 12% by mass with respect to the total amount of the ink composition.

Among a compound represented by Formula (A) and a compound represented by Formula (B), a compound represented by Formula (B) is particularly preferred in the points that viscosity of the ink can be further reduced and discharge property of the ink (for example, the consecutive discharge property) can be further improved.

Examples of a water-soluble solvent when an ink composition of the invention contains a water-soluble solvent, also include other water-soluble solvents besides a compound represented by Formula (A) and a compound represented by Formula (B).

In addition, as a water-soluble solvent, at least one selected from the group consisting of a compound represented by Formula (A) and a compound represented by Formula (B), and the other water-soluble solvent may be used in combination.

Examples of the other water-soluble solvent include, for example, polyvalent alcohols including glycols such as glycerin, 1,2,6-hexane triol, trimethylol propane, ethylene glycol, propylene glycol, diethylene glycol, triethylene glycol, tetraethylene glycol, pentaethylene glycol, and dipropylene glycol; and alkanediols such as 2-butene-1,4-diol, 2-ethyl-1,3-hexanediol, 2-methyl-2,4-pentanediol, 1,2-octanediol, 1,2-hexanediol, 1,2-pentanediol, and 4-methyl-1, 2-pentanediol; and in addition, sugars, sugar alcohols, hyaluronic acids, alkyl alcohols having from 1 to 4 carbon atoms, glycol ethers, 2-pyrrolidone and N-methyl-2-pyrrolidone described in paragraph [0116] of JP-A No. 2011-42150. These solvents may be suitably selected and used as one kind, or two or more kinds Examples of polyvalent alcohols, which are useful as a drying inhibitor or humectant, include the examples described in paragraph [0117] of JP-A No. 2011-42150. In addition, polyol compound is preferable as a penetrating agent, and examples of aliphatic diol include, for example, the examples described in paragraph [0117] of JP-A No. 2011-42150.

In addition, the other water-soluble solvent may be suitably selected from, for example, water-soluble solvents described in paragraphs [0176] to [0179] of JP-A No. 2011-46872, and water-soluble solvents described in paragraphs [0063] to [0074] of JP-A No. 2013-18846.

A content of a water-soluble solvent (the total content when two or more kinds are used) when an ink composition of the invention contains a water-soluble solvent is preferably 2% by mass to 20% by mass with respect to the total amount of the ink composition.

In a case in which a total content is 2% by mass or more, solubility of a polymerization initiator in the ink composition can be further enhanced.

In addition, in a case in which a total content is 20% by mass or less, a polymerizable compound can be sufficiently contained in the ink composition, and thus curability of the ink composition can be enhanced.

A total content is more preferably 3% by mass to 18% by mass, and further preferably 4% by mass to 15% by mass with respect to the total amount of the ink composition.

<Coloring Material>

The ink composition of the invention contains at least one coloring material.

A coloring material is not particularly limited, and may be a pigment or a dye.

(Pigment)

A pigment is not particularly limited, and can be suitably selected depending on purpose, and may be, for example, either an organic pigment, or an inorganic pigment. A pigment is preferably nearly insoluble or poorly soluble in water in the point of the ink colorability.

Examples of organic pigment include an azo pigment, a polycyclic pigment, a dye chelate, a nitro pigment, a nitroso pigment and aniline black. Among them, an azo pigment and a polycyclic pigment are preferable. Examples of inorganic pigment include titanium oxide, iron oxide, calcium carbonate, barium sulfate, aluminum hydroxide, barium yellow, cadmium red, chromium yellow and carbon black. Among them, carbon black is particularly preferable.

In a case in which an organic pigment is used, it is preferable that an average particle diameter of an organic pigment be small from the viewpoint of transparency and color reproductivity, while it is preferable to be large from the viewpoint of lightfastness. From the viewpoint of a balance of them, an average particle diameter is preferably 10 to 200 nm, more preferably 10 to 150 nm, and further preferably 10 to 120 nm. In addition, the particle diameter distribution of an organic pigment is not particularly limited, and may be either a broad particle diameter distribution or a mono-dispersion particle diameter distribution. In addition, an organic pigment having mono-dispersion particle diameter distribution may be used in a mixture of two or more kinds —Dispersant—

The ink composition of the invention may contain at least one dispersant.

That is, in a case in which a pigment is used in an ink composition of the invention, the pigment is preferably dispersed by a dispersant.

A dispersant of a pigment may be either a polymer dispersant, or a low molecular surfactant dispersant. In addition, a polymer dispersant may be either a water-soluble dispersant, or a water-insoluble dispersant.

As a low molecular surfactant dispersant, for example, a known low molecular surfactant dispersant described in paragraphs [0047] to [0052] of JP-A No. 2011-178029 may be used.

Examples of water-soluble dispersant among the polymer dispersant include hydrophilic polymer compounds. Examples of the water-soluble dispersant include natural hydrophilic polymer compounds, for example, vegetable polymers such as Arabia gum, tragacanth gum, guar gum, karaya gum, Locust bean gum, arabinogalactan, pectin, and quince seed starch; seaweed-based polymers such as alginic acid, carrageenan and agar; animal-based polymers such as gelatin, casein, albumin and collagen; microorganism-based polymers such as xanthan gum and dextran.

In addition, examples of a hydrophilic polymer compound obtained by modification from a raw material of a natural material include cellulose-based polymers such as methyl cellulose, ethyl cellulose, hydroxyethyl cellulose, hydroxypropyl cellulose and carboxymethyl cellulose; starch-based polymers such as sodium starch glycolate and sodium starch phosphate; seaweed-based polymers such as sodium alginate and propylene glycol alginate.

Furthermore, examples of a synthetic hydrophilic polymer compound include vinyl-based polymers such as polyvinyl alcohol, polyvinyl pyrrolidone, and polyvinyl methyl ether; acrylic resins such as non-bridged polyacrylamide, polyacrylic acid or an alkali metal salt thereof and water-soluble styrene acrylic resin; water-soluble styrene maleic acid resins; water-soluble vinyl naphthalene acrylic resins; water-soluble vinyl naphthalene maleic acid resins; polyvinyl pyrrolidone; polyvinyl alcohol; alkali metal salts of β-naphthalene sulfonic acid formalin condensate; polymer compounds having a salt of a cationic functional group such as quaternary ammonium and an amino group at a side chain; natural polymer compounds such as shellac.

Among them, a hydrophilic polymer compound is preferably a water-soluble dispersant in which a carboxyl group is introduced, such as a homopolymer of acrylic acid, methacrylic acid or styrene acrylic acid, and a copolymer with another monomer having a hydrophilic group.

Among the polymer dispersant, as a water-insoluble dispersant, a polymer having both of a hydrophobic moiety and a hydrophilic moiety may be used. Examples thereof include a styrene-(meth)acrylic acid copolymer, a styrene-(meth) acrylic acid-(meth)acrylic acid ester copolymer, a (meth) acrylic acid ester-(meth)acrylic acid copolymer, a polyethylene glycol (meth)acrylate-(meth)acrylic acid copolymer, a vinyl acetate-maleic acid copolymer and a styrene-maleic acid copolymer.

A weight average molecular weight of the polymer dispersant is preferably 3,000 to 100,000, more preferably 5,000 to 50,000, further preferably 5,000 to 40,000, and particularly preferably 10,000 to 40,000.

Meanwhile, a weight average molecular weight of the polymer dispersant is measured in a similar way to the weight average molecular weight of the polymer constituting the specific polymer particles described above.

The polymer dispersant preferably includes a polymer having a carboxyl group, preferably a polymer having a carboxyl group and an acid value of 100 mg KOH/g or less, and more preferably a polymer having a carboxyl group and an acid value of 25 to 100 mg KOH/g from the viewpoint of self-dispersibility, and flocculation speed at the time of contacting with a process liquid. Particularly, in a case in which the ink composition of the invention is used together with a process liquid that flocculates the components in the ink composition, a polymer dispersant is effectively a polymer having a carboxyl group, and an acid value of 25 to 100 mg KOH/g. The process liquid is described below.

A mixing mass ratio (p:s) of a pigment (p) and a dispersant (s) is preferably in a range of from 1:0.06 to 1:3, more preferably in a range of from 1:0.125 to 1:2, and further preferably from 1:0.125 to 1:1.5.

The ink composition of the invention preferably contains a pigment and a dispersant, and more preferably contains an organic pigment and a polymer dispersant (preferably, a polymer dispersant having a carboxyl group) from the viewpoint of lightfastness and quality of an image.

Furthermore, the ink composition preferably contains a polymer-coated pigment in which at least a portion of the surface of the pigment is coated with a polymer dispersant. Furthermore, the ink composition particularly preferably contains a polymer-coated pigment in which at least a portion of the surface of the pigment is coated with a polymer dispersant having a carboxyl group. Furthermore, the ink composition particularly preferably contains a water-insoluble polymer-coated pigment in which at least a portion of the surface of the pigment is coated with a polymer dispersant having a carboxyl group from the viewpoint of the flocculation.

An average particle diameter of the pigment (for example, the average particle diameter of the polymer-coated pigment) in the dispersion state is preferably 10 nm to 200 nm, more preferably 10 nm to 150 nm, and further preferably 10 nm to 100 nm. In a case in which an average particle diameter is 200 nm or less, color reproductivity improves, and jetting properties when jetting in accordance with inkjet method improves. In a case in which an average particle diameter is 10 nm or more, lightfastness improves. In addition, a particle diameter distribution of a coloring material is not particularly limited, and may be either a broad particle diameter distribution, or a mono-dispersion particle diameter distribution. In addition, a coloring material having mono-dispersion particle diameter distribution may be used in a mixture of two or more kinds. Herein, the average particle diameter of the pigment in the dispersion state represents the average particle diameter of the pigment in a state when the pigment being an ink, but the average particle diameter of the pigment in a state when the pigment is so-called concentrated ink dispersion, which is a step before being an ink, is similar.

Meanwhile, an average particle diameter of the pigment in a dispersion state is obtained in a similar way to the average particle diameter and the particle diameter distribution of the specific polymer particles described above.

A pigment may be used alone or may be used in two or more kinds in combination.

A content of the pigment in the ink composition is preferably 1% by mass to 20% by mass, and more preferably 2% by mass to 10% by mass with respect to the ink composition from the viewpoint of the image density.

(Dye)

As a dye, a known dye may be used without particular limitation, and for example, dyes described in JP-A Nos. 2001-115066, 2001-335714, 2002-249677 and the like, may be suitably used in the invention.

In addition, in a case in which a dye is used, a dye which is held on a water-insoluble carrier may be used. The carrier that holds a dye (water-insoluble coloring particle) may be used as an aqueous dispersion using a dispersant. The carrier is not particular limited as long as the carrier is insoluble or poorly soluble in water, and an inorganic material, an organic material and a complex material may be used. Specifically, the carriers described in JP-A Nos. 2001-181549, 2007-169418 and the like may be suitably used in the invention.

<Surfactant>

The ink composition in the invention may contain at least one surfactant as needed. As a surfactant, for example, an agent for adjusting the surface tension may be used.

As a surfactant, a compound having a structure having a hydrophilic moiety and a hydrophobic moiety together in the molecule, or the like may be used effectively, and any one of an anionic surfactant, a cationic surfactant, an ampholytic surfactant, a nonionic surfactant and a betaine-based surfactant may be used. Furthermore, the water-soluble polymer (polymer dispersant) may be also used as a surfactant.

A surfactant used in the invention is preferably a nonionic surfactant, and more preferably an acetylene glycol derivative (an acetylene glycol-based surfactant) from the viewpoint of suppressing the interference for inkjetting.

Examples of the acetylene glycol-based surfactant include, for example, 2,4,7,9-tetramethyl-5-decyne-4,7-diol and an alkylene oxide adduct of 2,4,7,9-tetramethyl-5-decyne-4,7-diol, and preferably at least one selected from them. Examples of commercial products of these compounds may include, for example, E series such as OLFINE E1010 manufactured by Nissin Chemical Industry Co., Ltd.

In a case in which the ink composition contains a surfactant (surface tension-adjusting agent), a content of the surfactant is preferably such that the surface tension of the ink composition is adjusted to 20 to 60 mN/m from the viewpoint of excellent discharge performance of the ink composition by an inkjet system, and more preferably 20 to 45 mN/m, and even more preferably 25 to 40 mN/m from the point of surface tension.

In a case in which a surfactant is contained in the ink composition of the invention, a specific amount of the surfactant is not particularly limited, but is preferably 0.1% by mass or more, more preferably 0.1 to 10% by mass, and still more preferably 0.2 to 3% by mass with respect to the total amount of the ink composition.

<Water-Soluble Polymer Compound>

The ink composition in the invention preferably contains at least one water-soluble polymer compound as needed. The water-soluble polymer compound is not particularly limited, and a known water-soluble polymer compound such as polyvinyl alcohol, polyacrylamide, polyvinyl pyrrolidone or polyethylene glycol may be used.

In addition, as the water-soluble polymer compound, the specific polymer compound described below that may be contained in the process liquid, or the water-soluble polymer compound described in paragraphs [0026] to [0080] of JP-A No. 2013-001854 is suitable.

<Antifoaming Agent>

The ink composition of the invention may contain at least one antifoaming agent as needed.

Examples of the antifoaming agent include, for example, silicone-based compounds (silicone-based antifoaming agent) and Pluronic-based compounds (Pluronic-based antifoaming agent). Among them, an antifoaming agent is preferably a silicone-based antifoaming agent.

The silicone-based antifoaming agent is preferably a silicone-based antifoaming agent having a polysiloxane structure.

As the antifoaming agent, a commercial product of an antifoaming agent may be used.

Examples of the commercial product include BYK-012, 017, 021, 022, 024, 025, 038 and 094 (manufactured by BYK Japan), KS-537, KS-604 and KM-72F (manufactured by Shin-Etsu Chemical Co., Ltd.), TSA-739 (manufactured by Momentive Performance Materials Inc. Japan limited company), OLFINE AF104 (manufactured by Nissin Chemical Industry Co., Ltd.).

Among them, an antifoaming agent is preferably BYK-017, 021, 022, 024, 025, 094, KS-537, KS-604, KM-72F or TSA-739, which is a silicone-based antifoaming agent, and most preferably BYK-024 in the point of discharge stability of the ink.

In a case in which the ink composition of the invention contains an antifoaming agent, a content of the antifoaming agent is preferably 0.0001% by mass to 1% by mass, and more preferably 0.001% by mass to 0.1% by mass with respect to the total amount of the ink composition.

<Colloidal Silica>

The ink composition of the invention may contain colloidal silica as needed.

This can further improve stability of the ink at the time of consecutive discharge.

The colloidal silica refers to a colloid having fine particles of an inorganic oxide including silicon having hundreds or less nm of average particle diameter. The colloidal silica may contain silicon dioxide (including a hydrate thereof) as a major component, and aluminate (sodium aluminate, potassium aluminate and the like) as a minor component.

In addition, colloidal silica may includes inorganic salts such as sodium hydroxide, potassium hydroxide, lithium hydroxide and ammonium hydroxide; and organic salts such as tetramethyl ammonium hydroxide. The inorganic salts and organic salts act, for example, as a colloid stabilizer.

With respect to the colloidal silica, for example, the descriptions of paragraphs [0043] to [0050] of JP-A No. 2011-202117 may be suitably referred to.

In addition, the ink composition of the invention may contain an alkali metal silicate instead of the colloidal silica, or in addition to the colloidal silica, as needed. With respect to the alkali metal silicate, the description of paragraphs [0052] to [0056] of JP-A No. 2011-202117 may be suitably referred to.

In a case in which the ink composition of the invention contains a colloidal silica, the content of the colloidal silica is preferably 0.0001% by mass to 10% by mass, more preferably 0.01% by mass to 3% by mass, even more preferably 0.02% by mass to 0.5% by mass, and particularly preferably 0.03% by mass to 0.3% by mass with respect to the total amount of the ink composition.

<Wax Particles>

The ink composition in the invention may contain at least one wax particles. This can further improve the scratch resistance.

Examples of the wax particles include, for example, vegetable-based and animal-based waxes such as carnauba wax, candelilla wax, beeswax, rice wax and lanolin; petroleum-based waxes such as paraffin wax, microcrystalline wax, polyethylene wax, polyethylene oxide wax and petrolatum; mineral-based waxes such as montan wax and ozocerite; synthetic waxes such as carbon wax, Hoechst wax, polyolefin wax and stearic acid amide; particles of a natural wax or a synthesized wax such as α-olefin/maleic anhydride copolymer, or mixed particles thereof.

The wax is preferably added in a form of dispersion, and may be contained in the ink composition as a dispersion such as an emulsion. In a case in which the wax is in a form of dispersion, water is preferable as a solvent, but not limited thereto. For example, an ordinarily used organic solvent may be suitably selected and used at the time of dispersion. With respect to an organic solvent, the description of paragraph [0027] of JP-A No. 2006-91780 may be referred to.

The wax particle may be used in one kind alone or may be used in a mixture of plural kinds As the wax particle, a commercial product on the market may be used. Examples of the commercial product include NOPCOTE PEM17 (manufactured by SAN NOPCO LIMITED), Chemipearl W4005 (manufactured by Mitsui Chemicals, Inc.), AQUACER 515 and AQUACER 593 (manufactured by BYK Japan for both of them).

Among them, the wax is preferably carnauba wax or polyolefin wax, and particularly preferably carnauba wax in the point of the scratch resistance.

In a case in which the ink composition of the invention contains the wax particle, the mass ratio of the polymer particles with respect to the wax particle is preferably in a range where the polymer particle:the wax particle=1:5 to 5:1 (ratio of the solid contents). When the mass ratio is in this range, the ink composition is excellent in the scratch resistance of an image.

<pH-Adjusting Agent>

The ink composition of the invention may contain at least one pH-adjusting agent as needed.

The pH-adjusting agent is not particularly limited as long as it can adjust pH to a desired value without adverse influence on the ink composition to be blended, and can be suitably selected depending on the purpose. For example, examples of the pH-adjusting agent include alcohol amines (for example, diethanolamine, triethanolamine, 2-amino-2-ethyl-1,3-propanediol and the like), alkali metal hydroxides (for example, lithium hydroxide, sodium hydroxide, potassium hydroxide and the like), ammonium hydroxides (for example, ammonium hydroxide, quaternary ammonium hydroxide and the like), phosphonium hydroxides and alkali metal carbonates.

When the ink composition of the invention contains a pH-adjusting agent, the content of the pH-adjusting agent is preferably in an amount that renders pH of the ink composition to be 5 to 10 (more preferably 8.0 to 9.5).

<Other Component>

The ink composition of the invention may contain other components as needed.

Examples of other components include, for example, known additives such as a polymerization inhibitor, a drying inhibitor (humectant), a fading inhibitor, an emulsion stabilizer, a penetration promoter, an ultraviolet ray absorbent, a preservative, a mildew-proofing agent, a viscosity-adjusting agent, a dispersion stabilizer, a corrosion inhibitor and a chelating agent.

The ink composition of the invention is preferably basic in order to suppress bleeding due to acid flocculation and obtain high resolution, and is preferably closely neutral in the view of temporal stability of the ink at a high temperature.

Specifically, a pH of the ink composition is preferably pH 5 to pH 10. In addition, the ink composition is more preferably pH 8.0 to pH 9.5. The ink composition is more preferably less than pH 9.5 from the viewpoint of suppressed load on the members used in the image formation.

<<Ink Set>>

An ink set of the invention contains the ink composition of the invention as described above, and a process liquid containing a flocculation component that forms an aggregate when the process liquid is brought into contact with the ink composition.

The ink set of the invention can suppress generation of a precipitate under a low temperature environment, and is excellent in discharge property, and has excellent scratch resistance and allows to form an image having reduced image irregularity due to use of the ink composition of the invention.

Furthermore, due to a process liquid contained in the ink set of the invention, the scratch resistance of an image is further improved, and the image irregularity is further reduced.

Meanwhile, details of the ink composition are as described above.

<Process Liquid>

Hereinafter, the process liquid is explained in detail.

The process liquid applied on the recording medium flocculates the dispersed particles such as the pigments and the polymer particles in the ink composition and immobilizes images on the recording medium when the process liquid is brought into contact with the ink composition. The process liquid contains at least a flocculation component for flocculating the components in the ink composition, and may further contain a polymerization initiator, and may be configured to further use other components as needed. In addition, by using the process liquid together with the ink composition, inkjet recording can be accelerated, and images are obtained having high density and resolution and excellent drafting (for example, reproducibility for a thin line or minute portion) even with high speed recording.

(Flocculation Component)

The process liquid contains at least one flocculation component.

The flocculation component may be a compound that can change pH of the ink composition, or a polyvalent metal salt, or a cationic polymer having quaternary or tertiary amine such as polyallyl amines. The flocculation component in the invention is preferably a compound that can change pH of the ink composition, and more preferably a compound that can lower pH of the ink composition from the viewpoint of flocculation of the ink composition.

Examples of the compound that can lower pH of the ink composition may include acidic substances.

Examples of the acidic substance include suitably, for example, sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophenecarboxylic acid, nicotinic acid, or derivatives of these compounds, or salts thereof.

The acidic substance may be used alone, or may be used in two or more in combination.

In a case in which the process liquid of the invention contains an acidic substance, pH (25° C.) of the process liquid is preferably 6 or less, more preferably 4 or less. Among them, pH (25° C.) is preferably in a range of from 1 to 4, particularly preferably from 1 to 3. At this time, pH (25° C.) of the ink composition is preferably 7.5 or more (more preferably 8.0 or more).

Among them, it is preferable that pH (25° C.) of the ink composition is 8.0 or more and pH (25° C.) of the process liquid is from 0.5 to 4 from the viewpoint of the image density, resolution, and acceleration of inkjet recording.

Among them, the flocculation component in the invention is preferably a highly water-soluble acidic substance, preferably an organic acid, more preferably a bifunctional or higher-functional organic acid, and particularly preferably a bifunctional or trifunctional acidic substance in the point of enhancing flocculation and immobilizing the entire ink. The bifunctional or higher-functional organic acid is preferably an organic acid having 3.5 or less, more preferably 3.0 or less of a first pKa. Specifically, examples of the bifunctional or higher-functional organic acid suitably include, for example, phosphoric acid, oxalic acid, malonic acid and citric acid.

With respect to the polyvalent metal salt and the cationic polymer, for example, the polyvalent metal salt and the cationic polymer described in paragraphs [0155] to [0156] of JP-A No. 2011-042150 may be used.

The flocculation component may be used alone or may be used in a mixture of two or more kinds The content of the flocculation component flocculating the ink composition in the process liquid is preferably in a range of 1 to 50% by mass, more preferably 3 to 45% by mass, and even more preferably 5 to 40% by mass.

(Water-Soluble Polymer Compound)

The process liquid preferably contains at least one water-soluble polymer compound.

The water-soluble polymer compound is not particularly limited, and a known water-soluble polymer compound such as polyvinyl alcohol, polyacrylamide, polyvinyl pyrrolidone and polyethylene glycol may be used.

In addition, as the water-soluble polymer compound, the specific polymer compounds described below and the water-soluble polymer compounds described in paragraphs [0026] to [0080] of JP-A No. 2013-001854 are also suitable.

A weight average molecular weight of the water-soluble polymer compound is not particularly limited, but for example, may be 10,000 to 100,000, preferably 20,000 to 80,000, and more preferably 30,000 to 80,000.

In addition, the content of the water-soluble polymer compound in the process liquid in the invention is not particularly limited, but is preferably 0.1% by mass to 10% by mass, more preferably 0.1% by mass to 4% by mass, even more preferably 0.1% by mass to 2% by mass, and particularly preferably 0.1% by mass to 1% by mass with respect to the total amount of the process liquid.

In a case in which the content is 0.1% by mass or more, spread of the ink droplet can be further promoted. In a case in which the content is 10% by mass or less, thickening of the process liquid can be further suppressed. In addition, in ca case in which the content is 10% by mass or less, coating irregularity of the process liquid due to bubbles in the process liquid can be further suppressed.

The water-soluble polymer compound is preferably a polymer compound containing a hydrophilic structural unit having an ionic group (preferably, an anionic group) (hereinafter, also referred to as the "specific polymer compound"). By the polymer compound, spread of the ink droplet applied on the recording medium can be further promoted, and irregularity of an image can be further suppressed.

Examples of the ionic group in the specific polymer compound include a carboxyl group, a sulfonic acid group, a phosphoric acid group, a boronic acid group, an amino group, an ammonium group, or a salt thereof. Among them, the ionic group is preferably a carboxyl group, a sulfonic acid group, a phosphoric acid group, or a salt thereof, more preferably a carboxyl group or a sulfonic acid group, or a salt thereof, and even more preferably a sulfonic acid group or a salt thereof.

The hydrophilic structural unit having an ionic group (preferably, an anionic group) is preferably a structural unit derived from a (meth)acrylamide compound having an ionic group (preferably an anionic group).

The content of the hydrophilic structural unit having an ionic group (preferably, an anionic group) in the water-soluble polymer compound may be, for example, 10 to 100% by mass, preferably 10 to 90% by mass, more preferably 10 to 70% by mass, even more preferably 10 to 50% by mass and particularly preferably 20 to 40% by mass in the total mass of the water-soluble polymer compound.

The specific polymer compound more preferably contains at least one hydrophobic structural unit in addition to at least one hydrophilic structural unit having an ionic group described above (preferably, an anionic group, particularly preferably a sulfonic acid group). By containing a hydrophobic structural unit, the specific polymer compound is further easily present on the surface of the process liquid, and thus spread of the ink droplet applied on the recording medium can be further promoted, and the irregularity of an image can be further suppressed.

The hydrophobic structural unit is preferably a structural unit derived from a (meth)acrylic acid ester (preferably, an alkyl ester having 1 to 4 carbon atoms of (meth)acrylic acid).

The content of the hydrophobic structural unit in the specific polymer compound may be, for example, 10 to 90% by mass, preferably 30 to 90% by mass, more preferably 50 to 90% by mass, and particularly preferably 60 to 80% by mass in the total mass of the specific polymer compound.

(Water)

The process liquid may be configured to contain water.

The content of water is not particularly limited, but is preferably in a range of from 10 to 99% by mass, more preferably from 50 to 90% by mass, and even more preferably from 60 to 80% by mass.

(Organic Solvent)

The process liquid preferably contains at least one kind selected from organic solvents.

As the organic solvent, those similar to the water-soluble solvent that may be contained in the ink composition, may be used. Among them, the organic solvent is preferably polyalkylene glycol or a derivative thereof, and more preferably at least one selected from diethylene glycolmonoalkyl ether, triethylene glycolmonoalkyl ether, dipropylene glycol, tripropylene glycolmonoalkyl ether, polyoxypropylene glyceryl ether or polyoxyethylene polyoxypropylene glycol from the viewpoint of curl suppression.

The content ratio of the organic solvent in the process liquid is not particularly limited, and is preferably from 1 to 30% by mass and more preferably from 5 to 15% by mass with respect to the entire process liquid from the viewpoint of curl suppression.

(Antifoaming Agent)

The process liquid may contain at least one antifoaming agent as needed.

Examples of the antifoaming agent that may be contained in the process liquid include the antifoaming agents contained in the ink composition.

In a case in which the process liquid contains an antifoaming agent, the content of an antifoaming agent is preferably 0.0001% by mass to 1% by mass, and more preferably 0.001% by mass to 0.1% by mass with respect to the total amount of the process liquid.

(Polymerization Initiator)

The process liquid may contain at least one polymerization initiator that initiates polymerization of the polymerizable compound in the ink composition by an active energy ray while a polymerization initiator being contained in the ink composition. The polymerization initiator may be used alone or in a mixture of two or more kinds, or along with a sensitizer.

The polymerization initiator used in the process liquid may be suitably selected from compounds that can initiate polymerization reaction of the polymerizable compound by an active energy ray in the same way to the ink composition. Examples of the polymerization initiator include polymerization initiators that generate active species (radical, acid, base and the like) by radiation or light, or electron beam (for example, photopolymerization initiator and the like).

Details of the polymerization initiator and the like are as explained in the section of the ink composition.

In addition, the process liquid may further contain other additives as other components as long as the effects of the present invention are not impaired. Examples of the other additives include known additives such as, a drying inhibitor (humectant), a fading inhibitor, an emulsified stabilizer, a penetration promoter, an ultraviolet ray absorbent, a preservative, a mildew-proofing agent, a pH-adjusting agent, a surface tension-adjusting agent, an antifoaming agent, a viscosity-adjusting agent, a dispersant, a dispersion stabilizer, a corrosion inhibitor and a chelating agent.

<<Image Forming Method>>

The image forming method of the invention has an ink-applying process of applying the ink composition of the invention as described above on a recording medium by an inkjet method, to form an image.

The image forming method of the invention forms fine images with good scratch resistance under various temperature environments including low temperature environment by using the ink composition of the invention.

<Ink-Applying Process>

The ink-applying process applies an ink composition of the invention as described above onto a recording medium by an inkjet method. In the process, the ink composition can be selectively applied onto a recording medium, and desired visible images can be formed. Meanwhile, details of the ink composition such as details of the ink composition and preferred aspects are as described above in the ink composition.

In the image formation by the inkjet method, the ink composition described above is discharged onto a desired recording medium by supplying energy, to form a colored image. Meanwhile, as a preferred inkjet method in the invention, the method described in paragraphs [0093] to [0105] of JP-A No. 2003-306623 may be applied.

The inkjet method is not particularly limited, and may be any known system, for example, a charge controlling system of discharging an ink utilizing an electrostatic attraction force, a drop on demand system (pressure pulse system) utilizing a vibration pressure of a piezo element, an acoustic inkjet system of discharging an ink utilizing radiation pressure for converting an electric signal into an acoustic beam and irradiating an ink with the beam, and a thermal inkjet system of heating an ink to form bubbles and utilizing the generated pressure (BUBBLE JET (trademark). As the inkjet method, particularly effectively utilized may be an inkjet method described in JP-A No. S54-59936, in which an ink that has been subjected to thermal energy to cause rapid volume change, and the action force from this change of the state discharges the ink from the nozzle.

Meanwhile, the inkjet method includes a system injecting an ink with a low concentration, which is called the photoink, in a fine volume and in a large number; a system improving image quality using plural inks having substantially the same hue and different concentrations; and a system using a colorless transparent ink.

As the inkjet head, there are a shuttle system in which short serial heads are used, and the recording is performed while the heads are scanned in the width direction of the recording medium, and a line system in which line heads are used and recording elements are arranged correspondingly to the whole area of one side of the recording medium. With the line system, image recording on an overall recording medium can be performed by scanning the recording medium in the direction intersecting the arrangement direction of the recording element, and a conveyance system such as a carriage that scans a short head becomes unnecessary. In addition, migration of a carriage and complicated scan controlling of the recording medium become unnecessary, and only the recording medium moves, and thus acceleration of the recording speed can be implemented in comparison to the shuttle system. Although the image forming method of the invention may be applied to any of these systems, effects of improving the discharge accuracy and the scratch resistance of an image are greater in ca case in which the image forming method of the invention is applied to the line system in which dummy jet is not generally performed.

The amount of the ink droplet discharged from the inkjet head is preferably from 1 to 10 pl (picoliter), and more preferably from 1.5 to 6 pl in the viewpoint of obtaining high fine image. In addition, different amounts of the liquid droplet in combination may be effectively discharged in the viewpoint of improving the connection of the image irregularity with the consecutive harmony, and the invention may be also suitably used in such case.

<Process Liquid-Applying Process>

The image forming method of the invention further preferably includes a process liquid-applying process of applying onto a recording medium, a process liquid containing a flocculation component that forms an aggregate when the process liquid is brought into contact with the ink composition.

This further improves the scratch resistance of an image, and further reduces the image irregularity.

In the process liquid-applying process, the process liquid containing a flocculation component that flocculates components in the ink composition is applied onto the recording medium, and the process liquid is brought into contact with the ink composition to form an image. In this case, the dispersed particles including the polymer particles in the ink composition are flocculated, and an image is immobilized on the recording medium. In addition, the process liquid contains at least the flocculation component, and details and preferred aspects of each of the components are as described above.

The application of the process liquid may be performed by applying a known method such as a coating method, an inkjet method and a dipping method. The coating method may be performed by using a known coating method such as a bar coater, an extrusion die coater, an air doctor coater, a blade coater, a rod coater, a knife coater, a squeeze coater, a reverse roll coater, a bar coater. Details of the inkjet method are as described above.

The process liquid-applying process may be performed either before or after the ink-applying process using the ink composition. In the invention, an aspect is preferable in which the ink-applying process is performed after the process liquid-applying process.

Specifically, an aspect is preferable in which the process liquid for flocculating the components in the ink composition (the dispersed particles described above) is applied onto a recording medium in advance before the ink composition is applied, and the ink composition is applied so as to be brought into contact with the process liquid that has been applied onto a recording medium to form an image. This can accelerate the inkjet recording, and allow an image having high density and resolution despite the high speed recording.

The applying amount of the process liquid is not particularly limited as long as it allows flocculation of the ink composition, but preferably may be an amount such that the applying amount of the flocculation component is 0.1 $g/m^2$ or more. Particularly, the applying amount of the process liquid is preferably an amount such that the applying amount of the flocculation component is 0.2 to 0.7 $g/m^2$. In a case in which the applying amount of the flocculation component is 0.1 $g/m^2$ or more, excellent high speed flocculation can be kept in accordance with various use forms of the ink composition. In addition, the applying amount of the flocculation component that is 0.7 $g/m^2$ or less is preferable in the point that the surface property of the applied recording medium is not affected (change of gloss, and the like).

In addition, in the invention, in a case in which the ink-applying process is performed after the process liquid-applying process, it is preferable to further perform a heating-drying process of heating and drying the process liquid on the recording medium after the process liquid is applied onto the recording medium and before the ink composition is applied. By heating and drying the process liquid in advance before the ink-applying process, coloring properties of the ink such as bleeding prevention become better, and a visible image having good color density and hue can be recorded.

The heating and drying may be performed by a known heating unit such as a heater and a ventilation unit utilizing ventilation such as a dryer, or a combination thereof. Examples of a method for the heating include, for example, a method in which heat is provided with a heater and the like from the opposite side of the process liquid-applying side of the recording medium; a method in which warm wind or hot wind is applied to the process liquid-applying side of the recording medium; a heating method using an infrared heater; and the heating may be performed with a combination thereof.

<Recording Medium>

The image forming method of the invention records an image on a recording medium. The recording medium is not particularly limited, and a general printing paper having cellulose as a main body and being used in general offset printing and the like, such as so-called wood free paper, coat paper and art paper, may be used. A general printing paper having cellulose as a main body is relatively slow in absorption and drying of an ink, and movement of a coloring material after the jetting may be easily occurred, so that the quality of the image in image recording by general inkjet method using an aqueous ink tends to be deteriorated. However, according to the image forming method of the invention, movement of the coloring material is suppressed, which allows high quality image recording that is excellent in the color density and the hue.

As the recording medium, those generally marketed may be used, and examples thereof include, wood free paper (A) such as the "OK PRINCE WOODFREE PAPER" manufactured by Oji Paper Co., Ltd., "SHIRAOI" manufactured by NIPPON PAPER INDUSTRIES CO., LTD., and "NEW NPI WOODFREE PAPER" manufactured by NIPPON PAPER INDUSTRIES CO., LTD.; fine coating paper such as the "OK EVERLIGHT COAT" manufactured by Oji Paper Co., Ltd. and "AURORA S" manufactured by NIPPON PAPER INDUSTRIES CO., LTD.; light coated paper (A3) such as the "OK COAT L" manufactured by Oji Paper Co., Ltd. and "AURORA L" manufactured by NIPPON PAPER INDUSTRIES CO., LTD.; coat paper (A2, B2) such as the "OK TOP COAT+" manufactured by Oji Paper Co., Ltd. and "AURORA COAT" manufactured by NIPPON PAPER INDUSTRIES CO., LTD.; art paper (A1) such as the "OK KINFUJI+" manufactured by Oji Paper Co., Ltd. and "TOKUBISHI ART" manufactured by MITSUBISHI PAPER MILLS LIMITED. In addition, various photo-exclusive papers for inkjet recording may be also used.

The recording medium is preferably so-called coat paper that is used in general offset printing and the like. The coat paper is a paper in which a coating layer is applied on the surface of wood free paper or neutral paper, having cellulose as a main body and not being generally surface-treated with a coating material, by coating a coating material. The coat paper may easily have a problem in the quality such as the gloss, the scratch resistance and the like of an image in the image formation by ordinary aqueous inkjet. However, according to the image forming method of the invention, the gloss irregularity can be suppressed, and thus an image having good gloss and scratch resistance can be obtained. Particularly, coat paper having a base paper and a coating layer containing an inorganic pigment is preferably used, and coated paper having a base paper and a coating layer containing at least one of kaolin or calcium bicarbonate is more preferably used. Specifically, art paper, coat paper, light coat paper, or fine coate paper is more preferable.

<Inkjet Recording Device>

An image forming device that can be used in the image forming method of the invention is not particularly limited, and a known image forming device described in JP-A Nos. 2010-83021, 2009-234221, H10-175315 and the like may be used.

The image forming device preferably has an active energy ray (for example, an ultraviolet ray) applying unit. With respect to the configurations of other unit including the active energy ray applying unit, for example, known configurations described in JP-A No. 2011-184628 and the like may be suitably referred to.

Hereinafter, an example of the image forming device that may be used in the image forming method of the invention is explained with reference to FIG. 1.

Further, an example of the inkjet recording device that is suitable in implementing the image forming method of the invention is specifically explained with reference to FIG. 1.

FIG. 1 is a schematic block diagram illustrating a configuration example of the inkjet recording device as a whole.

As shown in FIG. 1, in the inkjet recording device are arranged sequentially toward the conveyance direction of a recording medium (direction of the arrow in FIG. 1), a process liquid applying unit 12 that has a head 12S for discharging a process liquid that discharges the process liquid; a process liquid drying zone 13 that has a heating unit (not shown) that dries the applied process liquid; an ink discharge unit 14 that discharges various ink compositions; and an ink drying zone 15 that dries the discharged ink composition. In addition, an ultraviolet ray applying unit 16 that has an ultraviolet ray applying lamp 16S is arranged at the downstream side of the ink drying zone 15 in the conveyance direction of the recording medium.

The recording medium supplied to this inkjet recording device is sent by a conveyance roller from a supply unit that supplies the recording medium from a case that has been loaded with the recording medium, to the process liquid applying unit 12, the process liquid drying zone 13, the ink discharge unit 14, the ink drying zone 15 and the ultraviolet ray applying unit 16, successively, and is accumulated in an accumulation unit. For the conveying, a drum conveyance system using a drum-shaped member, a belt conveyance system, a stage conveyance system using a stage or the like may be adopted in addition to the method by a conveyance roller.

Among the plurally disposed conveyance rollers, at least one roller may be a driving roller to which power by a motor (not illustrated) is transmitted. The recording medium is conveyed in a prescribed conveyance amount in a prescribed direction by rotating the driving roller rotated by the motor at a constant speed.

In the process liquid applying unit 12, the head 12S for discharging the process liquid that is connected to a storage tank that stores the process liquid is arranged. The head 12S for discharging the process liquid discharges the process liquid from a discharge nozzle that is disposed opposite to the recording surface side of the recording medium so that the process liquid can be droplet applied onto the recording medium. Meanwhile, the process liquid applying unit 12 is not limited to the discharge system from the nozzle-shaped head, but a coating system using a coating roller may be also adopted. With this coating system, it is possible to easily apply the process liquid onto substantially the whole surface including an image region to which the ink droplets are landed on a recording medium with the ink discharge unit 14 that is disposed at the downstream side. In order to make a constant thickness of the process liquid on the recording medium, for example, an air knife may be used, or a method may be performed in which a member having a sharp angle is disposed such that a gap corresponding to a prescribed amount of the process liquid is arranged between the member and the recording medium, or the like.

The process liquid drying zone 13 is disposed at the downstream side of the recording medium conveyance direction of the process liquid applying unit 12. The process liquid drying zone 13 can be configured using a known heating unit such as a heater, a ventilation unit utilizing ventilation such as a dryer, or a combination units thereof. Examples of the heating unit include a method in which a heating body such as a heater is disposed at the opposite side to the process liquid-applying side of the recording medium (for example, underneath a conveyance mechanism that loads and conveys the recording medium when the recording medium is automatically conveyed); a method in which warm wind or hot wind is applied to the process liquid-applying side of the recording medium; a heating method using an infrared heater; and the like, and the heating may be performed with a combination thereof.

In addition, a measurement unit that measures the surface temperature of the recording medium, and a controlling mechanism that provides feedback of the value of the surface temperature of the recording medium measured with the measurement unit to a heating control unit are preferably arranged so that the process liquid is applied while the temperature is controlled since the surface temperature of the recording medium changes depending on the kind (quality of materials, thickness and the like) of the recording medium, environmental temperature and the like. The measurement unit that measures the surface temperature of the recording medium is preferably a contact or non-contact thermometer.

In addition, removal of the solvent may be performed using a roller for solvent removal or the like. As another aspect, a system may be used in which an excessive solvent is removed from the recording medium with an air knife The ink discharge unit 14 is disposed at the downstream side of the recording medium conveyance direction of the process liquid drying zone 13. In the ink discharge unit 14, heads 30K, 30C, 30M and 30Y for recording (head for ink discharge) that are connected to each of ink storage units that store each of color inks of black (K), cyan (C), magenta (M) and yellow (Y) are disposed. In each of the ink storage units not shown, an ink composition containing a pigment correspondingly to each of the hues, the polymer particles, the water-soluble solvent and water are stored, and are supplied to each of the heads for ink discharge 30K, 30C, 30M and 30Y as needed for image recording. In addition, as shown in FIG. 1, recording heads 30A and 30B for special color ink discharge may be further arranged to discharge the special color ink as needed at the downstream side of the conveyance direction of the heads for ink discharge 30K, 30C, 30M, and 30Y.

The heads for ink discharge 30K, 30C, 30M and 30Y discharge an ink corresponding to each of images from the discharge nozzle that is disposed opposite to the recording surface side of the recording medium. Thereby, each of the color inks is applied onto the recording side of the recording medium, and the color image is recorded.

Any one of the head for discharging the process liquid 12S, and the heads for ink discharge 30K, 30C, 30M and 30Y, 30A, and 30B is a full line head in which multiple discharge ports (nozzles) are arranged over a maximum recording width (maximum recording width) of an image recorded on the recording medium. With the full line head, image recording can be performed at a high speed on the recording medium in comparison to a serial type head in which the recording is performed while a short shuttle head is scanned back-and-forth in the width direction (direction that is orthogonal to the conveyance direction at the recording medium conveyance side) of the recording medium. In the invention, either serial type recording, or a system allowing relatively high speed recording, for example, recording in a single path system in which one line is formed with one scanning may be adopted. However, according to the image recording method of the invention, high quality image having high reproducibility can be obtained even with the single path system.

Herein, the head for discharging the process liquid 12S, and the heads for ink discharge 30K, 30C, 30M and 30Y, 30A, and 30B have the same structure.

The applying amount of the process liquid and the applying amount of the ink composition are preferably regulated as needed. For example, the applying amount of the process liquid may be changed depending on the recording medium for regulating the physical properties such as viscoelasticity of a flocculate in which the process liquid and the ink composition may be mixed.

The ink drying zone 15 is disposed at the downstream side of the recording medium conveyance direction of the ink discharge unit 14. The ink drying zone 15 may be configured in the same way as the process liquid drying zone 13.

The ultraviolet ray applying unit 16 is further disposed at the downstream side of the recording medium conveyance direction of the ink drying zone 15, and an ultraviolet ray is applied by an ultraviolet ray applying lamp 16S arranged in the ultraviolet ray applying unit 16, and monomer components in the image after drying the image are polymerized and cured. The ultraviolet ray applying lamp 16S irradiates the whole of the recording surface with a lamp disposed opposite to the recording surface side of the recording medium, and curing of the entire image is performed. Meanwhile, the ultraviolet ray applying unit 16 is not limited to the ultraviolet ray applying lamp 16S, but a halogen lamp, a high-pressure mercury lamp, laser, LED, an electron beam applying device or the like may be adopted.

The ultraviolet ray applying unit 16 may be disposed in front of or behind the ink drying zone 15, and may be disposed both in front of and behind the ink drying zone 15.

In addition, in the inkjet recording device, a heating unit that conducts heating treatment on the recording medium may be disposed on a conveyance path from the supply unit to the accumulation unit. For example, a heating unit may be disposed at a desired position such as the upstream side of the process liquid drying zone 13 and a position between the ink discharge unit 14 and the ink drying zone 15, whereby to heat the recording medium to a desired temperature, which enables the drying and the fixation to be effectively performed.

Embodiments of the invention are exemplified below.

<1> An ink composition for inkjet printing, the ink composition containing water, a coloring material, a polymerizable compound, a polymerization initiator represented by the following Formula (X), and polymer particles having a glass transition temperature of 90° C. or higher, a mass ratio of the polymer particles to the polymerization initiator represented by Formula (X) being in a range of from 1:10 to 10:1.

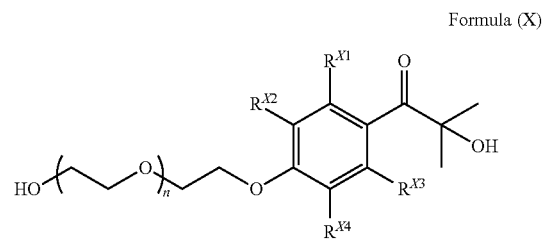

Formula (X)

In Formula (X), each of $R^{X1}$, $R^{X2}$, $R^{X3}$, and $R^{X4}$ independently represents a hydrogen atom or a substituent; and n represents an integer from 1 to 4.

<2> The ink composition for inkjet printing according to <1>, wherein the polymerizable compound contains a (meth)acrylamide compound represented by the following Formula (1).

Formula (1)

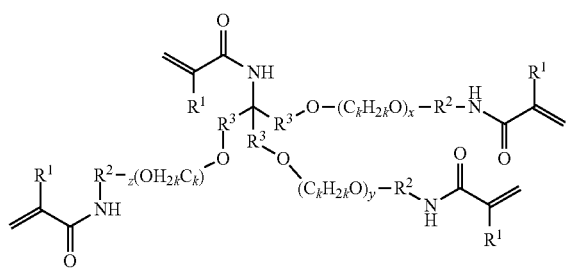

In Formula (1), $R^1$ represents a hydrogen atom or a methyl group; $R^2$ represents a linear or branched alkylene group having from 2 to 4 carbon atoms, provided that, $R^2$ does not have a structure in which an oxygen atom and a nitrogen atom bonded to both ends of $R^2$ are bonded to an identical carbon atom of $R^2$; $R^3$ represents a divalent linking group; k represents 2 or 3; each of x, y and z independently represents an integer from 0 to 6, and x+y+z equals 0 to 18.

<3> The ink composition for inkjet printing according to <1> or <2>, further containing a water-soluble solvent containing at least one selected from the group consisting of a compound represented by the following Formula (A) and a compound represented by the following Formula (B).

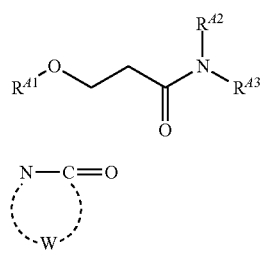

Formula (A)

Formula (B)

In Formula (A), $R^{41}$ represents a linear or branched alkyl group having from 1 to 6 carbon atoms; each of $R^{42}$ and $R^{43}$ independently represents a hydrogen atom or a linear or branched alkyl group having from 1 to 4 carbon atoms.

In Formula (B), W represents a divalent linking group that forms a heterocycle together with the carbon atom and the nitrogen atom in Formula (B). [0018] <4> The ink composition for inkjet printing according to <3>, wherein the water-soluble solvent contains 3-n-butoxy-N,N-dimethyl-propione amide.

<5> The ink composition for inkjet printing according to <3> or <4>, wherein the water-soluble solvent contains 2-pyrrolidone.

<6> The ink composition for inkjet printing according to any one of <1> to <5>, further containing 1-[4-(2-hydroxy-ethoxy)-phenyl]-2-hydroxy-2-methyl-1-propane-1-one in a mass ratio of from 1:10 to 10:1 with respect to the polymerization initiator represented by Formula (X).

<7> The ink composition for inkjet printing according to any one of <1> to <6>, wherein the mass ratio of the polymer particles with respect to the polymerization initiator represented by Formula (X) is from 1:10 to 5:1.

<8> The ink composition for inkjet printing according to <6>, wherein the mass ratio of 1-[4-(2-hydroxyethoxy)-phenyl]-2-hydroxy-2-methyl-1-propane-1-one with respect to the polymerization initiator represented by Formula (X) is from 3:10 to 3:1.

<9> The ink composition for inkjet printing according to any one of <1> to <8>, wherein each of the $R^{X1}$, the $R^{X2}$, the $R^{X3}$, and the $R^{X4}$ independently represents a hydrogen atom, a halogen atom, an alkyl group, an alkoxy group, a hydroxy group, an alkylthio group, a mercapto group, an acyl group, or an amino group.

<10> The ink composition for inkjet printing according to any one of <1> to <9>, wherein a content of the polymer particles is 0.3% by mass to 10.0% by mass with respect to a total amount of the ink composition for inkjet.

<11> The ink composition for inkjet printing according to any one of <1> to <10>, wherein a content of the polymerization initiator represented by Formula (X) is 0.3% by mass to 10.0% by mass with respect to a total amount of the ink composition for inkjet.

<12> The ink composition for inkjet printing according to any one of <1> to <11>, wherein the polymerizable compound is selected from the group consisting of the following polymerizable compound a, the following polymerizable compound b and the following polymerizable compound c, the polymerization initiator represented by Formula (X) is selected from the group consisting of a compound represented by the following Formula (X)-1 and a compound represented by the following Formula (X)-2, and the polymer particles are particles of benzyl methacrylate/methyl methacrylate/methacrylic acid copolymer.

Polymerization compound a

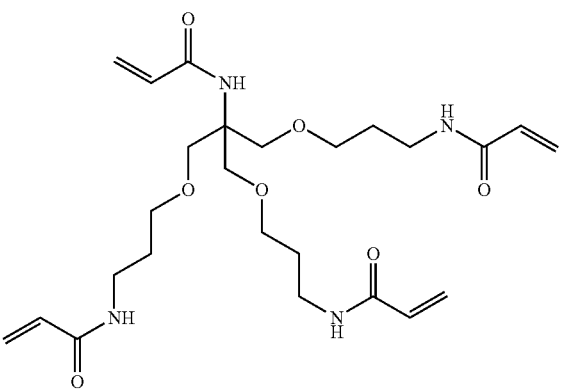

Polymerization compound b

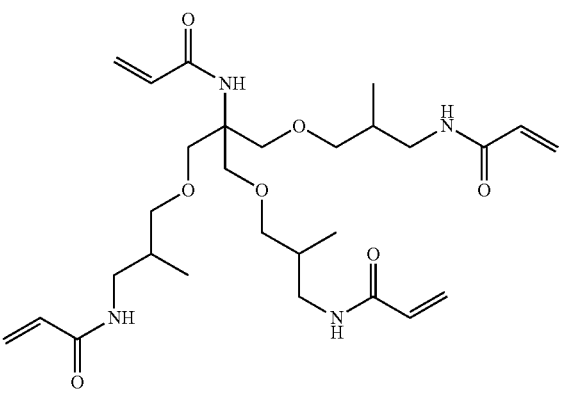

-continued

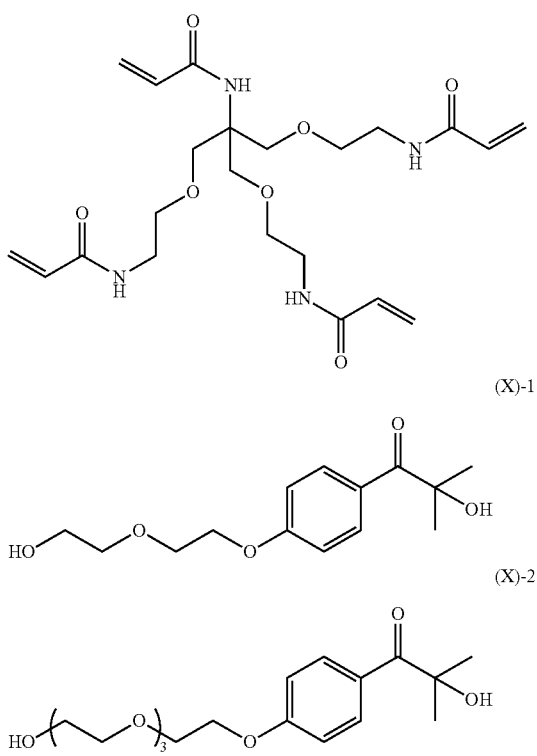

Polymerizable compound c (X)-1 (X)-2

<13> An ink set, containing the ink composition for inkjet printing according to any one of <1> to <12>, and a process liquid containing a flocculation component that forms an aggregate when the process liquid is brought into contact with the ink composition.

<14> An image forming method that uses the ink set according to <13>, the method including a process liquid-applying process of applying the process liquid onto a recording medium, and an ink-applying process of applying the ink composition of the ink set according to claim 13 onto the recording medium by an inkjet method to form an image.

EXAMPLES

Hereinafter, the invention is explained further specifically with Examples. However, the invention is not limited thereto as far as not exceeding the gist of the invention. Meanwhile, the "parts" and "%" are based on mass unless stated otherwise.

<Preparation of Polymer Dispersant Solution 1>

To a reaction vessel, 6 parts of styrene, 11 parts of stearyl methacrylate, 4 parts of styrene macromer AS-6 (manufactured by TOAGOSEI Co., Ltd.), 5 parts of Brenmar PP-500 (manufactured by NOF CORPORATION), 5 parts of methacrylic acid, 0.05 parts of 2-mercapto ethanol, and 24 parts of methyl ethyl ketone were added, to prepare a mixed solution. On the other hand, to a dripping funnel, 14 parts of styrene, 24 parts of stearyl methacrylate, 9 parts of styrene macromer AS-6 (manufactured by TOAGOSEI Co., Ltd.), 9 parts of Brenmar PP-500 (manufactured by NOF CORPORATION), 10 parts of methacrylic acid, 0.13 parts of 2-mercapto ethanol, 56 parts of methyl ethyl ketone, and 1.2 parts of 2,2'-azo bis(2,4-dimethylvaleronitrile) were added, to prepare a mixed solution.

Then, the mixed solution in the reaction vessel was heated to 75° C. while being stirred under nitrogen atmosphere, and the mixed solution in the dripping funnel was slowly dripped over 1 hour. After passage of 2 hours from completion of the dripping, a solution of 1.2 parts of 2,2'-azo bis(2,4-dimethylvaleronitrile) dissolved in 12 parts of methyl ethyl ketone was dripped over 3 hours, and further matured at 75° C. for 2 hours and at 80° C. for 2 hours, to obtain a polymer dispersant solution 1.

The weight average molecular weight measured for a portion of the obtained polymer dispersant solution 1 with the measurement method described above was 25,000 in the polystyrene conversion. In addition, the acid value of the polymer obtained with the method described in JIS standard (JIS K0070: 1992) was 99 mg KOH/g.

<Preparation of Pigment Dispersion M>

5.0 g in the solid content conversion of the obtained polymer dispersant solution 1, 10.0 g of a magenta pigment (Pigment Red 122, manufactured by Dainichiseika Color & Chemicals Mfg. Co., Ltd.), 40.0 g of methyl ethyl ketone, 8.0 g of 1 mol/L (liter; the same below) sodium hydroxide and 82.0 g of ion exchanged water were supplied to a vessel along with 300 g of 0.1 mm zirconia bead, and dispersed for 6 hours at 1000 rpm using Ready Mill disperser (manufactured by AIMEX Co., Ltd.). The obtained dispersion was concentrated under reduced pressure with an evaporator until methyl ethyl ketone could be sufficiently distillated, and further concentrated until the concentration of the pigment became 10%, to prepare a pigment dispersion M of the polymer-coated magenta pigment.

The volume average particle diameter (secondary particle) of the obtained pigment dispersion M was measured by dynamic light scattering using Micorotrac particle size distribution measurement device (trade name Version 10.1.2-211 BH, manufactured by NIKKISO CO., LTD.), and was 84 nm.

<Preparation of Pigment Dispersion Y>

A pigment dispersion Y of the polymer-coated yellow pigment was obtained in a similar way to the preparation of the pigment dispersion M except that Irgalite Yellow GS (Pigment Yellow 74, manufactured by BASF Japan) was used instead of Pigment Red 122 used as the pigment in the preparation of the pigment dispersion M. The volume average particle diameter (secondary particle) of the pigment dispersion Y measured in a similar way to the pigment dispersion M was 75 nm.

<Preparation of Pigment Dispersion K>

A pigment dispersion K of the polymer-coated black pigment was obtained in a similar way to the preparation of the pigment dispersion M except that carbon black MA-100 (black pigment manufactured by Mitsubishi Chemical Corporation) was used instead of Pigment Red 122 used as the pigment in the preparation of the pigment dispersion M. The volume average particle diameter (secondary particle) of the pigment dispersion K measured in a similar way to the pigment dispersion M was 80 nm.

<Preparation of Pigment Dispersion C>

As a pigment dispersion C, CABO-JET250C (Pigment Blue 15:4 (PB15:4); cyan pigment dispersion manufactured by Cabot Corporation) was prepared. The pigment dispersion C is a pigment dispersion of a polymer-coated cyan pigment in which PB15:4 is coated with the polymer. The volume average particle diameter (secondary particle) of the pigment dispersion C measured in the same way to the pigment dispersion M was 110 nm.

<Synthesis of Polymerizable Compound>

Exemplary compounds of the (meth)acrylamide compound represented by Formula (1), that is, Polymerizable compound a, Polymerizable compound b, and Polymerizable compound c, were synthesized, respectively.

Synthesis of these compounds was performed in accordance with the method of described in paragraphs [0123] to [0128] of JP-A No. 2013-18846.

<Synthesis of Self-Dispersive Polymer Particle P-1 (Polymer Particle)>

A 2 liter three-necked flask equipped with a stirrer, a thermometer, a reflux cooling tube and a nitrogen gas introducing tube was charged with 360.0 g of methyl ethyl ketone, and was heated to 75° C. Then, a mixed solution containing 151.2 g benzyl methacrylate, 172.8 g methyl methacrylate, 36.0 g methacrylic acid, 72 g methyl ethyl ketone, and 1.44 g "V-601" (manufactured by Wako Pure Chemical Industries, Ltd.) was dripped at a constant velocity such that the dripping was completed in 2 hours, while the temperature in the flask was kept at 75° C. After completion of the dripping, the mixed solution was added with a solution containing 0.72 g "V-601" and 36.0 g methyl ethyl ketone, stirred at 75° C. for 2 hours, and then further added with a solution containing 0.72 g "V-601" and 36.0 g isopropanol, and stirred at 75° C. for 2 hours. Then, the mixed solution was heated to 85° C., and further continued to be stirred for 2 hours, to obtain a polymer solution of a copolymer of benzyl methacrylate/methyl methacrylate/methacrylic acid (=42/48/10 [mass ratio]).

The weight average molecular weight (Mw) of the obtained copolymer measured similarly was 58,000 (computed in the polystyrene conversion by gel permeation chromatography (GPC)), and the acid value was 32.6 mg KOH/g.

Next, 668.3 g of the obtained polymer solution was weighed, and added with 388.3 g isopropanol and 145.7 ml aqueous solution of 1 mol/L NaOH, and heated to 80° C. for the temperature in the reaction vessel. Next, 720.1 g distilled water was dripped at a speed of 20 ml/min, and the reaction solution was dispersed in water, and then kept at 80° C. for 2 hours, at 85° C. for 2 hours and at 90° C. for 2 hours for the temperature in the reaction vessel under atmospheric pressure. Then, the inside of the reaction vessel was held under reduced pressure, and 913.7 g in total of isopropanol, methyl ethyl ketone and distilled water was distillated, to obtain a water dispersion of the self-dispersive polymer particle P-1 (polymer particle) having 28.0% by mass of the solid content concentration (density of the polymer particles).

Among the structural components (structural units) of the self-dispersive polymer particle P-1, a structural component (structural unit) derived from benzyl methacrylate, a structural component (structural unit) derived from methyl methacrylate, and a structural component (structural unit) derived from methacrylic acid are also referred to as the "structural component A", the "structural component B", the "structural component C", respectively below.

In addition, the mass ratio of the structural component A, the structural component B, and the structural component C [mass of the structural component A/mass of the structural component B/mass of the structural component C] is also referred to as the mass ratio of the structural components [A/B/C] below.

The glass transition temperature (Tg) of the self-dispersive polymer particle P-1 was measured with the method below, and was 90° C.

—Measurement of Glass Transition Temperature (Tg)—

An aqueous dispersion of 0.5 g in the solid content of the self-dispersive polymer particles was dried under reduced pressure at 50° C. for 4 hours, to obtain the solid content of the polymer. Using the obtained solid content of the polymer, Tg was measured by differential scanning calorimetry (DSC) EXSTAR6220 manufactured by SII NanoTechnology Inc. For the measurement conditions, 5 mg of the sample amount was sealed in an aluminum pan, and the value of the peak top of DSC of the measured data at the second heating with the temperature profile below under nitrogen atmosphere was assumed to be Tg.

30° C.→−50° C. (cooled at 50° C./minute)
−50° C.→120° C. (heated at 20° C./minute)
120° C.→−50° C. (cooled at 50° C./minute)
−50° C.→120° C. (heated at 20° C./minute)

The self-dispersive polymer particle P-1 is the polymer particle that is used in the preparation of Ink 1 and others below.

Self-dispersive polymer particles used in Inks 2 to 20 were synthesized, respectively in a similar way to the self-dispersive polymer particle P-1 except that the kind of the structural component A and the mass ratio of the respective structural components [the structural component A/the structural component B/the structural component C]) were changed as shown in Table 1 below in the synthesis of the self-dispersive polymer particle P-1.

<Synthesis of Water-Soluble Polymer Compound (Water-Soluble Polymer)>

A water-soluble polymer compound (water-soluble polymer 1) used as a component in the process liquid was synthesized. This synthesis was performed in accordance with paragraphs [0200] to [0204] and [0229] of JP-A No. 2013-001854.

The structure of Water-soluble polymer 1 is shown below.

Meanwhile, the numbers at the lower right of the respective structural units in Water-soluble polymer 1 shown below represent the mass ratio (% by mass), and Mw represents the weight average molecular weight.

Water-Soluble Polymer 1

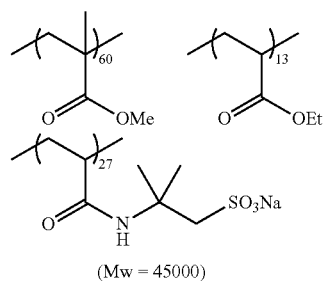

(Mw = 45000)

Example 1

Experiments with respect to the kind of the polymer particles and the kind of the polymerization initiators, and the like in the ink were performed as Example 1.

Details are shown below.

<Preparation and Evaluation for Ink 1>
(Preparation of Ink 1)

The components in the composition below were mixed, and passed through a membrane filter (0.5 μm pore diameter) to remove coarse particles, to obtain Ink 1 (the ink composition), which was a black ink.

The pH of the produced Ink 1 was 8.8.

—Composition of Ink 1—

| | |
|---|---|
| Pigment dispersion K | 20.0% by mass |
| Pigment dispersion M | 4.2% by mass |
| Pigment dispersion C | 4.2% by mass |
| Polymerizable compound a (specific example of the compound represented by Formula (1)) | 15.0% by mass |
| Polymerization initiator (exemplary compound (X-1); specific example of the compound represented by Formula (X)) | 2.0% by mass |
| 2-Pyrrolidone (specific example of the compound represented by Formula (B)) | 10.0% by mass |
| Glycerin | 3.0% by mass |
| OLFINE E1010 (manufactured by Nissin Chemical Industry Co., Ltd., surfactant) | 1.0% by mass |
| Self-dispersive polymer particle P-1 | 3.0% by mass |
| SNOWTEX XS (manufactured by Nissan Chemical Industries, Ltd., colloidal silica) | 0.3% by mass |
| BYK-024 (manufactured by BYK Japan, antifoaming agent) | 0.01% by mass |
| Triethanolamine | 0.2% by mass |
| Ion exchanged water | Balance to 100% by mass of the total |

At this time, the mass ratio of the self-dispersive polymer particles with respect to the polymerization initiator [self-dispersive polymer particles/polymerization initiator] was 1.5.

<Evaluation for Precipitate after Low Temperature Storage>

100 ml of Ink 1 was put into a 200 ml plastic bottle, and stored under the condition of −5° C. for 14 days (low temperature storage). The bottom of the plastic bottle after this low temperature storage was visually observed, and an evaluation for a precipitate after the low temperature storage (precipitate after the ink was stored at low temperature) was performed in accordance with the evaluation criteria below.

The results of the evaluations are shown in Table 1 below.

—Evaluation Criteria for Precipitate at Low Temperature—

A: No precipitate is seen after storage under the condition of −5° C. for 14 days.

B: Precipitate is only slightly seen after storage under the condition of −5° C. for 14 days (level in which when the total amount of the ink is filtered with a microfilter, and presence of a precipitate can be slightly confirmed on at least one of the filter or the wall of the plastic bottle).

C: Pulverulent precipitate is largely seen after storage under the condition of −5° C. for 14 days.

D: Big crystalline precipitate is largely seen after storage under the condition of −5° C. for 14 days.

<Image Formation and Evaluation>

GELJET GX5000 printer head manufactured by Ricoh Company, Ltd. was provided.

This printer head is a line head where 96 nozzles stand in a line.

This printer head was fixed and placed in an inkjet recording device having the same configuration as the inkjet recording device illustrated in FIG. 1 described above.

The placement at this time was a placement where the direction of 96 nozzles standing in a line inclined by 75.7° with respect to the orthogonal direction on a plane identical to the movement direction of the stage of the inkjet device.

A storage tank connected to the printer head was filled with the supernatant liquid of Ink 1 stored under −5° C. for 14 days.

The components of the composition below were mixed to prepare a process liquid.

—Composition of the Process Liquid—

| | |
|---|---|
| Diethylene glycolmonoethyl ether | 5.0% by mass |
| Tripropylene glycolmonomethyl ether | 5.0% by mass |
| Malonic acid | 8.0% by mass |
| Malic acid | 8.0% by mass |
| 85% Phosphoric acid | 5.0% by mass |
| Water-soluble polymer 1 described above | 0.5% by mass |
| Antifoaming agent (TSA-739 (15%) manufactured by Momentive Performance Materials Inc. Japan limited company; emulsion type silicon-antifoaming agent) | 0.01% by mass as amount of silicon-oil |
| Ion exchanged water | Balance to 100% by mass of the total |

The pH (25° C.) of the process liquid 1 was 1.0. Meanwhile, the pH was measured with a pH meter WM-50EG manufactured by DKK-TOA CORPORATION while the temperature was controlled to 25° C.

(Image Formation)

OK TOPCOAT (manufactured by Oji Paper Co., Ltd.) was used as a recording medium, and the process liquid-applying process, the drying process, and the ink-applying process described below were sequentially performed to form (record) an image on a recording medium.

—Process Liquid-Applying Process—

OK TOPCOAT was fixed on a stage which is movable at 500 mm/second in the linear direction, and was coated with each of the process liquids obtained above in about 1.7 g/m$^2$ with a wire bar coater.

—Drying Process—

Drying of the recording medium at the condition of 50° C. was initiated using a drier after 1.5 seconds from the time of completion of applying the process liquid at the spot where the application of the process liquid was completed, and the drying was completed after 3.5 seconds from the time of completion of applying the process liquid at the spot. The drying time at this time is 2 seconds.

—Ink-Applying Process—

Inkjetting was initiated with the mode below within 2 seconds after the drying process.

—Jetting Mode—

Ink 1 was discharged in a line mode from the printer head at discharge conditions of 3.5 μL of the ink droplet amount, 24 kHz of the discharge frequency, 1200 dpi×1200 dpi of the resolution and 50 mm/s of the stage speed while a recording medium was moved at a constant speed in the movement direction of the stage, and a solid image was printed. As Ink 1, those obtained by deaeration through a deaeration filter and temperature control to 30° C. was used.

The solid image immediately after the printing was dried at 60° C. for 3 seconds, and the solid image after the drying was irradiated with UV (an ultraviolet ray) to cure the solid image.

The irradiation of UV (an ultraviolet ray) was performed at a condition of 1.5 W/cm$^2$ of the illuminance (integrated irradiation amount: 0.75 J/cm$^2$) by controlling a light source power and a conveyance speed using a metal halide lamp manufactured by EYE GRAPHICS Co., Ltd. (maximum irradiation wavelength: 365 nm).

(Evaluation for Scratch Resistance of Image)

A 100% solid image was recorded in about 6 mm width on a recording medium, and immediately after the recording, a recording medium (a recording medium identical to the recording medium used in the recording) that has no recording was overlapped with the recorded solid image (hereinafter, also referred to as the "recorded image"), and an operation of rubbing the image 10 times back-and-forth with 150 kg/m² load was performed. After this operation, the scratch on the recorded image, and the transcription degree of the ink to the recording medium that has no recording were visually observed, and the scratch resistance of the image was evaluated in accordance with the evaluation criteria below.

The results of the evaluations are shown in Table 1 below.
—Evaluation Criteria for Scratch Resistance of Image—
A: No ink transcription to the recording medium that has no recording.
B: Nearly no scratch on the recorded image is recognized, but the ink transcription to the recording medium that has no recording is slightly recognized.
C: Slight scratch on the recorded image is recognized, and the ink transcription to the recording medium that has no recording is also seen.
D: Scratch on the recorded image is remarkable, and the ink transcription to the recording medium that has no recording is also remarkable.

(Evaluation for Consecutive Discharge Property of Ink)

Discharge from all nozzles was confirmed when the discharge was initiated, and then the consecutive discharge for 45 minutes (operation of discharging an ink for 45 minutes consecutively. The same below.) was performed.

The number of the discharge nozzles was counted at the time point when this 45 minute consecutive discharge was completed, and the discharge rate was computed from the equation below.

On the basis of the discharge rate, the consecutive discharge property of the ink was evaluated in accordance with the evaluation criteria below.

The results of the evaluations are shown in Table 1 below.

Discharge rate (%)=((Number of discharge nozzles at the time point when 45 minute consecutive discharge was completed)/(total nozzle number))×100

—Evaluation Criteria for Consecutive Discharge Property of Ink—
A: Ink discharge rate at the time point when 45 minute consecutive discharge is completed, is 98% or more.
B: Ink discharge rate at the time point when 45 minute consecutive discharge is completed, is 95% or more and less than 98%.
C: Ink discharge rate at the time point when 45 minute consecutive discharge is completed, is 90% or more and less than 95%.
D: Ink discharge rate at the time point when 45 minute consecutive discharge is completed, is less than 90%.

(Evaluation for Image Irregularity)

Solid images were printed in 5 step densities, respectively, and then the image irregularity was visually evaluated.

The results of the evaluations are shown in Table 1 below.
—Evaluation Criteria for Image Irregularity—
A: No irregularity is seen on the solid images in all the 5 step densities.
B: Irregularity is slightly seen on the solid images in low densities, that is, steps 1 to 4 among the 5 steps, but there is no practical problem.
C: Irregularity is seen on the solid images in all the 5 step densities.
D: Remarkable irregularity is seen on the solid images in all the 5 step densities.

<Preparation and Evaluation for Inks 2 to 20>

Inks 2 to 20 were prepared respectively in a similar way to the preparation of Ink 1 except that the kind of the self-dispersive polymer particles and the kind of the polymerization initiator were changed as shown in Table 1 below, and for each of these inks, evaluations were performed in a similar way to Ink 1.

The results of the evaluations are shown in Table 1 below.

In Table 1 below, the kind of the structural component A, the mass ratio [A/B/C], and the weight average molecular weight (Mw) are shown with respect to the polymer particles.

Meanwhile, the structural component A is shown with the name of the monomer. The abbreviations thereof are as described below.

BzMA Benzyl methacrylate
PheOEA Phenoxyethylacrylate
IBOMA Isobornyl methacrylate
CyHMA Cyclohexyl methacrylate Details of the polymerization initiators in Table 1 below are as described below.

(X)-1: Exemplary compound (X)-1 described above (the polymerization initiator represented by Formula (X))
(X)-2: Exemplary compound (X)-2 described above (the polymerization initiator represented by Formula (X))
IRGACURE 2959: "IRGACURE 2959", polymerization initiator manufactured by BASF Japan Ltd. (compound name: 1-[4-(2-hydroxyethoxy)-phenyl]-2-hydroxy-2-methyl-1-propane-1-one)
Ex-1: Polymerization initiator of the structure below (S-1 described in JP-A No. 2009-143972)
Ex-2: Polymerization initiator of the structure below (S-27 described in JP-A No. 2009-143972)

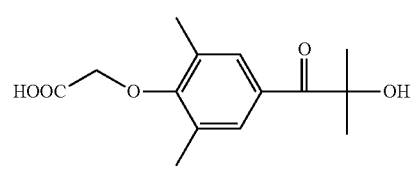

Ex-1

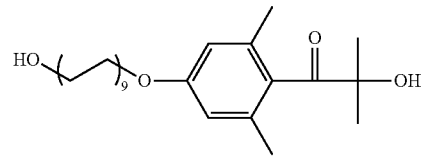

Ex-2

TABLE 1

| | | Self-dispersive polymer particle | | | | Precipitate | | | | |
|---|---|---|---|---|---|---|---|---|---|---|
| Ink No. | Tg (° C.) | Structural component A | Mass ratio of [A/B/C] | Mw | Polymerization initiator | after low temperature storage | Scratch resistance | Consecutive discharge property | Image irregularity | Remark |
| 1 | 90 | BzMA | 42/48/10 | 58000 | (X)-1 | A | B | A | B | Present Invention |
| 2 | 76 | BzMA | 70/20/10 | 58000 | (X)-1 | A | C | A | C | Comparative Example |

TABLE 1-continued

| Ink No. | Tg (° C.) | Self-dispersive polymer particle Structural component A | Mass ratio of [A/B/C] | Mw | Polymerization initiator | Precipitate after low temperature storage | Scratch resistance | Consecutive discharge property | Image irregularity | Remark |
|---|---|---|---|---|---|---|---|---|---|---|
| 3 | 100 | BzMA | 25/65/10 | 60000 | (X)-1 | A | A | A | A | Present Invention |
| 4 | 111 | BzMA | 5/85/10 | 63000 | (X)-1 | A | A | A | A | Present Invention |
| 5 | 73 | PheOEA | 52/38/10 | 57000 | (X)-1 | A | C | A | C | Comparative Example |
| 6 | 90 | PheOEA | 30/60/10 | 58000 | (X)-1 | A | A | A | B | Present Invention |
| 7 | 102 | PheOEA | 15/75/10 | 60000 | (X)-1 | A | A | A | A | Present Invention |
| 8 | 117 | IBOMA | 5/85/10 | 57000 | (X)-1 | A | A | A | A | Present Invention |
| 9 | 127 | IBOMA | 20/70/10 | 58000 | (X)-1 | A | A | A | A | Present Invention |
| 10 | 141 | IBOMA | 42/48/10 | 61000 | (X)-1 | A | A | A | A | Present Invention |
| 11 | 110 | CyHMA | 20/70/10 | 57000 | (X)-1 | A | A | A | A | Present Invention |
| 12 | 76 | BzMA | 70/20/10 | 58000 | (X)-2 | A | C | A | D | Comparative Example |
| 13 | 100 | BzMA | 25/65/10 | 60000 | (X)-2 | A | B | A | B | Present Invention |
| 14 | 141 | IBOMA | 42/48/10 | 61000 | (X)-2 | A | B | A | B | Present Invention |
| 15 | 100 | BzMA | 25/65/10 | 60000 | Ex-1 | D | C | D | B | Comparative Example |
| 16 | 100 | BzMA | 25/65/10 | 60000 | Ex-2 | B | D | D | B | Comparative Example |
| 17 | | No addition | | | (X)-1 | A | D | A | D | Comparative Example |
| 18 | | No addition | | | IRGACURE 2959 | C | D | C | D | Comparative Example |
| 19 | 76 | BzMA | 70/20/10 | 58000 | IRGACURE 2959 | D | D | C | D | Comparative Example |
| 20 | 100 | BzMA | 25/65/10 | 60000 | IRGACURE 2959 | D | D | D | D | Comparative Example |

As shown in Table 1, with the ink of the invention containing a polymerization initiator represented by Formula (X) and polymer particles having a glass transition temperature of 90° C. or higher, generation of the precipitate after the low temperature storage was suppressed, and the scratch resistance of an image and the consecutive discharge property of the ink were excellent, and the image irregularity was suppressed.

Particularly, it was confirmed from comparison to Ink 3 and Ink 20 that by using the polymerization initiator represented by Formula (X), generation of the precipitate after the low temperature storage (after storage under the condition of −5° C. for 14 days. The same below) was remarkably suppressed.

On the other hand, with Inks 18 to 20 (Comparative Examples) containing IRGACURE 2959 as the polymerization initiator, a precipitate was generated after the low temperature storage. Among them, with Inks 19 and 20 containing the polymer particles, generation of the precipitate was remarkable.

In addition, with Inks 17 and 18 (Comparative Examples) containing no polymer particles, the scratch resistance of an image was remarkably deteriorated, and the image irregularity was remarkable.

Meanwhile, with Inks 19 and 20 (Comparative Examples) containing the polymer particles, the scratch resistance of an image was deteriorated, and the image irregularity was remarkable. It is considered that the reason for this is that image formation was performed using the supernatant liquid of the ink after storage under −5° C. for 14 days in these evaluations. That is, it is considered that the reason for this is that the polymerization initiator is precipitated by this storage, and thus a substantial content of the polymerization initiator in the ink (supernatant liquid) used in the image formation is reduced, which leads to deteriorated curability of the image.

Example 2

Experiments for the content of the polymer particles, the content of the polymerization initiator, and the mass ratio [polymer particles/polymerization initiator] were performed as Example 2.

Specifically, evaluations were performed in the same way to Ink 3 of Example 1 except that the content of the polymer particles, the content of the polymerization initiator, and the mass ratio [polymer particles/polymerization initiator] were changed as shown in Table 2 below in Ink 3 of Example 1.

The results of the evaluations are shown in Table 2 below.

TABLE 2

| Ink No. | Content of self-dispersive polymer particle (% by mass) | Content of polymerization initiator (% by mass) | Mass Ratio [self-dispersive polymer particle/polymerization initiator] | Precipitate after low temperature storage | Scratch resistance | Consecutive discharge property | Image irregularity | Remark |
|---|---|---|---|---|---|---|---|---|
| 3 | 3.0 | 2.0 | 1.5 | A | A | A | A | Present Invention |
| 21 | 0.1 | 3.0 | 0.03 | A | C | A | D | Comparative Example |
| 22 | 0.3 | 3.0 | 0.1 | A | B | A | B | Present Invention |
| 23 | 1.0 | 3.0 | 0.3 | A | A | A | A | Present Invention |
| 24 | 2.0 | 3.0 | 0.7 | A | A | B | A | Present Invention |
| 25 | 3.0 | 3.0 | 1.0 | A | A | B | A | Present Invention |
| 26 | 5.0 | 3.0 | 1.7 | A | A | B | A | Present Invention |
| 27 | 5.0 | 1.0 | 5.0 | A | A | B | A | Present Invention |
| 28 | 10.0 | 1.0 | 10.0 | A | B | C | B | Present Invention |

TABLE 2-continued

| Ink No. | Content of self-dispersive polymer particle (% by mass) | Content of polymerization initiator (% by mass) | Mass Ratio [self-dispersive polymer particle/polymerization initiator] | Precipitate after low temperature storage | Scratch resistance | Consecutive discharge property | Image irregularity | Remark |
|---|---|---|---|---|---|---|---|---|
| 29 | 12.0 | 1.0 | 12.0 | B | C | D | B | Comparative Example |

As shown in Table 2, with the ink having 0.1 to 10.0 of the mass ratio [self-dispersive polymer particles/polymerization initiator] (the invention), generation of the precipitate after the low temperature storage was suppressed, the scratch resistance of an image and the consecutive discharge property of the ink were excellent, and the image irregularity was suppressed.

On the other hand, when this mass ratio was less than 0.1, the scratch resistance of an image was deteriorated, and the image irregularity was remarkable (Ink 21: Comparative Example).

In addition, when this mass ratio exceeded 10, the consecutive discharge property of the ink was deteriorated. Furthermore, a precipitate after the low temperature storage tended to be generated (Ink 29: Comparative Example).

Example 3

Experiments with respect to the kind and the content of the polymerizable compound were performed as Example 3.

Specifically, evaluations were performed in the same way to Ink 3 of Example 1 except that the kind and the content of the polymerizable compound were changed as shown in Table 3 below in Ink 3 of Example 1.

The results of the evaluations are shown in Table 3 below.

Details of the kinds of the polymerizable compounds in Table 3 below are as described below.

ExRC-1: Tetrafunctional acrylamide compound that does not correspond to the compound represented by Formula (1) (tetrafunctional acrylamide compound described in paragraph [0141] of JP-A No. 2013-18846)

ExRC-2: Cationic oligomer that does not correspond to the compound represented by Formula (1) (Cationic oligomer 7 described in JP-A No. 2000-186242)

TABLE 3

| Ink No. | Polymerizable compound Kind | Addition amount | Precipitate after low temperature storage | Scratch resistance | Consecutive discharge property | Image irregularity | Remark |
|---|---|---|---|---|---|---|---|
| 3 | Polymerizable compound a | 15.0% by mass | A | A | A | A | Present Invention |
| 31 | Polymerizable compound b | 15.0% by mass | A | A | A | B | Present Invention |
| 32 | Polymerizable compound c | 15.0% by mass | A | A | A | B | Present Invention |
| 33 | Hydroxyethyl acrylamide | 15.0% by mass | A | B | B | B | Present Invention |
| 34 | Dimethyl acrylamide | 15.0% by mass | A | B | C | C | Present Invention |
| 35 | Diacetone acrylamide | 15.0% by mass | A | B | C | C | Present Invention |
| 36 | Polymerizable compound a / Hydroxyethyl acrylamide | 12.0% by mass / 3.0% by mass | A | B | A | A | Present Invention |
| 37 | Polymerizable compound a / Diacetone acrylamide | 12.0% by mass / 3.0% by mass | A | B | A | A | Present Invention |
| 38 | Polymerizable compound a / Hydroxyethyl acrylamide | 7.5% by mass / 7.5% by mass | A | B | B | A | Present Invention |
| 39 | ExRC-1 | 15.0% by mass | B | C | C | B | Present Invention |
| 40 | ExRC-2 | 15.0% by mass | B | C | C | B | Present Invention |

As shown in Table 3, with the inks using Polymerizable compounds a to c corresponding to the (meth)acrylamide compound represented by Formula (1) as the polymerizable compound, it was confirmed that the scratch resistance of an image was excellent and the image irregularity was suppressed, and the consecutive discharge property of the ink was excellent.

Particularly, when the ratio of the (meth)acrylamide compound represented by Formula (1) occupying in the total polymerizable compounds was 80% by mass or more (Inks 3, 31, 32, 36, and 37), it was confirmed that the consecutive discharge property of the ink was particularly excellent.

Example 4

Experiments with respect to the kind of the water-soluble solvent were performed as Example 4.

Specifically, evaluations were performed in the same way to Ink 3 of Example 1 except that the kind of the water-soluble solvent was changed as shown in Table 4 below in Ink 3 of Example 1. The results of the evaluations are shown in Table 4 below.

Details of the kind of the water-soluble solvent in Table 4 below are as described below.

S-1: 3-n-butoxy-N,N-dimethylpropione amide (Exemplary compound A-2 of the compound represented by Formula (A))

S-2: 3-n-propoxy-N,N-dimethylpropione amide (Exemplary compound A-17 of the compound represented by Formula (A))

S-3: 3-methoxy-N,N-dimethylpropione amide (Exemplary compound A-1 of the compound represented by Formula (A))

S-5: 1-hydroxyethyl-2-pyrrolidone (specific example of the compound represented by Formula (B))

S-6: 1-ethyl-2-pyrrolidone (specific example of the compound represented by Formula (B))

S-7: 1-cyclohexyl-2-pyrrolidone (specific example of the compound represented by Formula (B))

S-8: SANNIX GP250 (manufactured by Sanyo Chemical Industries, Ltd.)

S-9: dipropylene glycol and Inks 41 to 46), generation of the precipitate after the low temperature storage was remarkably suppressed.

Furthermore, with the inks containing the compound represented by in Formula (B) (Ink 3, and Inks 44 to 46), the consecutive discharge property of the ink was remarkably excellent.

Example 5

Experiments with respect to the kind and the content of the polymerization initiator were performed as Example 5.

Specifically, evaluations were performed in the same way to Ink 1 of Example 1 except that the kind and the content of the polymerization initiator were changed as shown in Table 5 below in Ink 1 of Example 1.

The results of the evaluations are shown in Table 5 below.

TABLE 4

| Ink No. | Solvent | Precipitate after low temperature storage | Scratch resistance | Consecutive discharge property | Image irregularity | Remark |
| --- | --- | --- | --- | --- | --- | --- |
| 3 | 2-pyrrolidone | A | A | A | A | Present Invention |
| 41 | S-1 | A | A | B | A | Present Invention |
| 42 | S-2 | A | B | B | A | Present Invention |
| 43 | S-3 | A | B | B | A | Present Invention |
| 44 | S-5 | A | B | A | A | Present Invention |
| 45 | S-6 | A | B | A | A | Present Invention |
| 46 | S-7 | A | B | A | A | Present Invention |
| 47 | S-8 | B | B | B | B | Present Invention |
| 48 | S-9 | B | B | B | B | Present Invention |

As shown in Table 4, with the inks containing the compound represented by Formula (A) or the compound represented by Formula (B) as the water-soluble solvent (Ink 3

In Table 5 below, DAROCUR 1173 is a polymerization initiator manufactured by BASF Japan Ltd. (compound name: 2-hydroxy-2-methyl-1-propane-1-one).

TABLE 5

| Ink No. | Polymerization initiator Kind | Polymerization initiator Content (% by mass) | Mass ratio [IRGACURE 2959/(I)-1] | Precipitate after low temperature storage | Scratch resistance | Consecutive discharge property | Image irregularity | Remark |
| --- | --- | --- | --- | --- | --- | --- | --- | --- |
| 1 | (X)-1 | 2.0 | 0.0 | A | B | A | B | Present Invention |
| 51 | (X)-1 | 1.8 | 0.1 | A | B | A | B | Present Invention |
|  | IRGACURE 2959 | 0.2 |  |  |  |  |  |  |
| 52 | (X)-1 | 1.5 | 0.3 | A | A | A | A | Present Invention |
|  | IRGACURE 2959 | 0.5 |  |  |  |  |  |  |
| 53 | (X)-1 | 1.0 | 1.0 | A | A | A | A | Present Invention |
|  | IRGACURE 2959 | 1.0 |  |  |  |  |  |  |
| 54 | (X)-1 | 0.5 | 3.0 | A | A | A | A | Present Invention |
|  | IRGACURE 2959 | 1.5 |  |  |  |  |  |  |
| 55 | (X)-1 | 0.2 | 9.0 | B | B | B | B | Present Invention |
|  | IRGACURE 2959 | 1.8 |  |  |  |  |  |  |
| 56 | (X)-1 | 0.5 | 2.0 | A | A | A | A | Present Invention |
|  | IRGACURE 2959 | 1.0 |  |  |  |  |  |  |
|  | DAROCUR 1173 | 0.5 |  |  |  |  |  |  |

TABLE 5-continued

| Ink No. | Polymerization initiator Kind | Content (% by mass) | Mass ratio [IRGACURE 2959/(I)-1] | Precipitate after low temperature storage | Scratch resistance | Consecutive discharge property | Image irregularity | Remark |
|---|---|---|---|---|---|---|---|---|
| 57 | IRGACURE 2959 | 2.0 | — | D | D | D | D | Comparative Example |

As shown in Table 5, it was confirmed that Inks 51 to 56 having 0.1 to 10.0 of the mass ratio [IRGACURE 2959/(I)-1] (particularly, Inks 52 to 54 having 0.3 to 3.0 of the mass ratio [IRGACURE 2959/(I)-1]) exhibited equal, or better than equal effects with regard to improvement of the scratch resistance, improvement of the consecutive discharge property, and suppression of the image irregularity, in comparison to Ink 1 having 0.0 of the mass ratio [IRGACURE 2959/(I)-1].

Example 6

As Example 6, the magenta ink, the cyan ink, and the yellow ink described below were prepared, respectively, and experiments were performed in the same way to Example 1 using these inks.

Herein, the magenta ink was prepared in a similar way to Ink 1 except that Pigment dispersion M only was used as a pigment dispersion.

In addition, the cyan ink was prepared in a similar way to Ink 1 except that Pigment dispersion C only was used as a pigment dispersion.

In addition, the yellow ink was prepared in a similar way to Ink 1 except that Pigment dispersion Y only was used as a pigment dispersion.

As a result thereof, all of the inks exhibited effects equal to those of Ink 1 in Example 1 with regard to suppression of generation of the precipitate after the low temperature storage, improvement of the scratch resistance, improvement of the consecutive discharge property, and suppression of the image irregularity.

What is claimed is:

1. An ink composition for inkjet printing, the ink composition comprising water, a coloring material, a polymerizable compound, a polymerization initiator represented by the following Formula (X), a water-soluble solvent that contains at least one selected from the group consisting of a compound represented by the following Formula (A) and a compound represented by the following Formula (B), the water-soluble solvent containing at least 3-n-butoxy-N,N-dimethylpropione amide, and polymer particles having a glass transition temperature of 90° C. or higher, a mass ratio of the polymer particles to the polymerization initiator represented by Formula (X) being in a range of from 1:10 to 10:1:

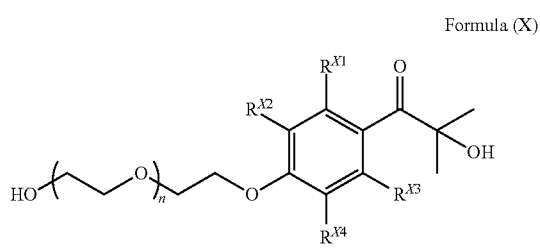

Formula (X)

wherein, in Formula (X), each of $R^{X1}$, $R^{X2}$, $R^{X3}$, and $R^{X4}$ independently represents a hydrogen atom or a substituent; and n represents an integer from 1 to 4;

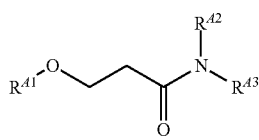

Formula (A)

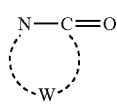

Formula (B)

wherein, in Formula (A), $R^{41}$ represents a linear or branched alkyl group having from 1 to 6 carbon atoms; each of $R^{42}$ and $R^{43}$ independently represents a hydrogen atom or a linear or branched alkyl group having from 1 to 4 carbon atoms, and wherein, in Formula (B), W represents a divalent linking group that forms a heterocycle together with the carbon atom and the nitrogen atom in Formula (B).

2. The ink composition for inkjet printing according to claim 1, wherein the polymerizable compound comprises a (meth)acrylamide compound represented by the following Formula (1):

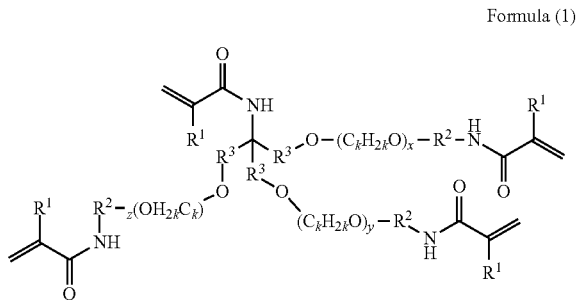

Formula (1)

wherein, in Formula (1), $R^1$ represents a hydrogen atom or a methyl group; $R^2$ represents a linear or branched alkylene group having from 2 to 4 carbon atoms, provided that $R^2$ does not have a structure in which an oxygen atom and a nitrogen atom bonded to both ends of $R^2$ are bonded to an identical carbon atom of $R^2$; $R^3$ represents a divalent linking group; k represents 2 or 3; each of x, y and z independently represents an integer from 0 to 6, and x+y+z equals 0 to 18.

3. The ink composition for inkjet printing according to claim 1, wherein the water-soluble solvent contains 2-pyrrolidone.

4. The ink composition for inkjet printing according to claim 1, further comprising 1-[4-(2-hydroxyethoxy)-phenyl]-2-hydroxy-2-methyl-1-propane-1-one in a mass ratio of from 1:10 to 10:1 with respect to the polymerization initiator represented by Formula (X).

5. The ink composition for inkjet printing according to claim 4, wherein the mass ratio of 1-[4-(2-hydroxyethoxy)-phenyl]-2-hydroxy-2-methyl-1-propane-1-one with respect to the polymerization initiator represented by Formula (X) is from 3:10 to 3:1.

6. The ink composition for inkjet printing according to claim 1, wherein the mass ratio of the polymer particles with respect to the polymerization initiator represented by Formula (X) is from 1:10 to 5:1.

7. The ink composition for inkjet printing according to claim 1, wherein each of $R^{X1}$, $R^{X2}$, $R^{X3}$, and $R^{X4}$ independently represents a hydrogen atom, a halogen atom, an alkyl group, an alkoxy group, a hydroxy group, an alkylthio group, a mercapto group, an acyl group, or an amino group.

8. The ink composition for inkjet printing according to claim 1, wherein a content of the polymer particles is from 0.3% by mass to 10.0% by mass with respect to a total amount of the ink composition for inkjet printing.

9. The ink composition for inkjet printing according to claim 1, wherein a content of the polymerization initiator represented by Formula (X) is from 0.3% by mass to 10.0% by mass with respect to a total amount of the ink composition for inkjet printing.

10. The ink composition for inkjet printing according to claim 1, wherein the polymerizable compound is selected from the group consisting of the following polymerizable compound a, the following polymerizable compound b and the following polymerizable compound c, the polymerization initiator represented by Formula (X) is selected from the group consisting of a compound represented by the following Formula (X)-1 and a compound represented by the following Formula (X)-2, and the polymer particles are particles of benzyl methacrylate/methyl methacrylate/methacrylic acid copolymer:

Polymerization compound a

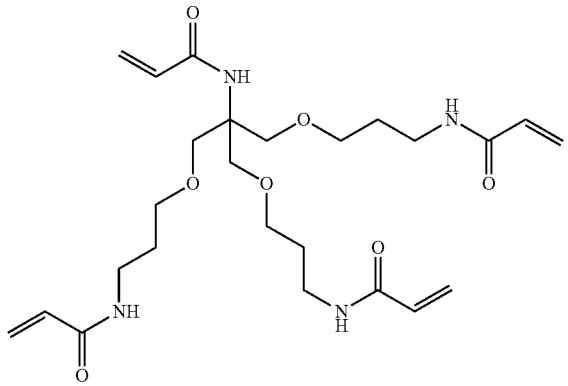

Polymerization compound b

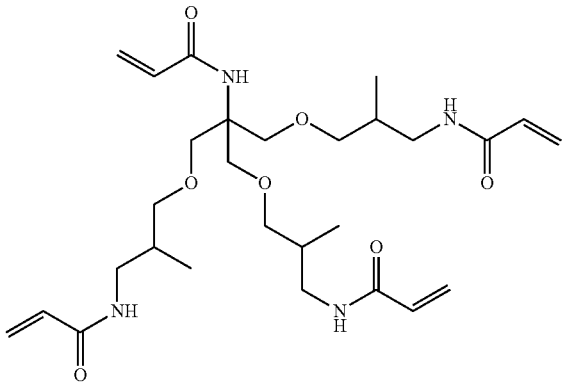

Polymerizable compound c

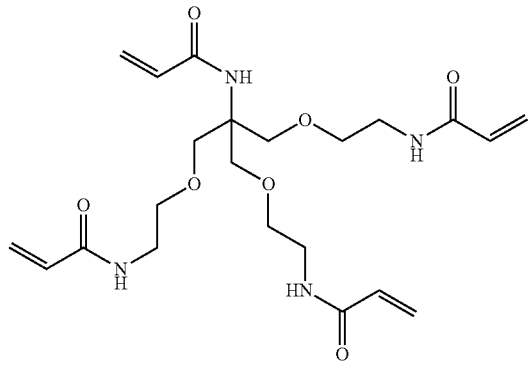

(X)-1

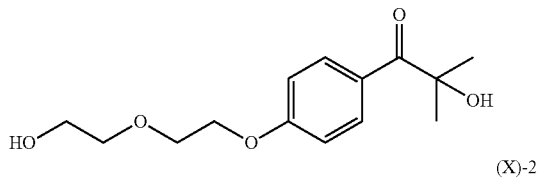

(X)-2

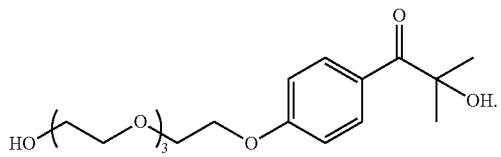

11. An ink set, comprising:
the ink composition for inkjet printing according to claim 1; and
a process liquid comprising a flocculation component that forms an aggregate when the process liquid is brought into contact with the ink composition.

12. An image forming method that uses the ink set according to claim 11, the method comprising:
a process liquid-applying process of applying the process liquid onto a recording medium; and
an ink-applying process of applying the ink composition of the ink set according to claim 11 onto the recording medium by an inkjet method to form an image.

* * * * *